(12) United States Patent
Johnson

(10) Patent No.: US 7,339,630 B2
(45) Date of Patent: Mar. 4, 2008

(54) METHOD AND SYSTEM FOR A CORRELATION SHARPENING FILTER

(75) Inventor: Shawn Val Johnson, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 462 days.

(21) Appl. No.: 10/943,641

(22) Filed: Sep. 17, 2004

(65) Prior Publication Data

US 2005/0219421 A1    Oct. 6, 2005

Related U.S. Application Data

(60) Provisional application No. 60/559,178, filed on Apr. 2, 2004.

(51) Int. Cl.
*H04N 9/78* (2006.01)

(52) U.S. Cl. ....................... 348/668; 348/663
(58) Field of Classification Search ........ 348/663–670; H04N 9/78
See application file for complete search history.

(56) References Cited

U.S. PATENT DOCUMENTS 5,140,410 A * 8/1992 Shin .......................... 348/669
5,654,770 A * 8/1997 Hatano et al. .............. 348/668

\* cited by examiner

*Primary Examiner*—M. Lee
(74) *Attorney, Agent, or Firm*—McAndrews, Held & Malloy, Ltd.

(57) ABSTRACT

Methods and systems for correlation sharpening filtering of a composite video signal are provided. A correlation between a current pixel and at least one adjacent pixel may be determined. A plurality of chroma video signal components of a composite video signal may be blended based on the determined correlation. A luma video signal component may be determined based on the blended chroma video signal components. At least a portion of the plurality of chroma video signal components may be filtered, resulting in filtered chroma video signals. At least a portion of the plurality of chroma video signal components may be blended with the filtered chroma video signal based on the determined correlation. The blended at least a portion of the plurality of chroma video signal components may be removed from the composite video signal to obtain the luma video signal component.

23 Claims, 21 Drawing Sheets

METHOD AND SYSTEM FOR A CORRELATION SHARPENING FILTER

CROSS-REFERENCE TO RELATED APPLICATIONS/INCORPORATION BY REFERENCE

This application makes reference to, claims priority to, and claims the benefit of U.S. Provisional Application Ser. No. 60/559,178, filed Apr. 2, 2004 and entitled "NTSC Correlation Sharpening Filter."

This application makes reference to:
U.S. application Ser. No. 10/943,267 filed Sep. 17, 2004;
U.S. application Ser. No. 10/943,587 filed Sep. 17, 2004;
U.S. application Ser. No. 10/943,593 filed Sep. 17, 2004;
U.S. application Ser. No. 10/943,596 filed Sep. 17, 2004; and
U.S. application Ser. No. 10/869,395 filed Jun. 16, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for correlation sharpening filtering of a composite video signal.

BACKGROUND OF THE INVENTION

A composite video signal is the sum of a luminance (brightness) signal and a chrominance (color) signal. These signals may be referred to as luma and chroma signals, respectively. The frequency ranges of the luma and chroma signals are designed to overlap. In video processing, the luma and chroma signal components are added together in order to generate a composite video signal. The luma and chroma video elements are integrated and broadcasted as a single composite video stream. Once the broadcasted composite signal is received, the luma and chroma signal components must be separated in order for the video signal to be processed and displayed. A comb filter may be utilized for separating the chroma and luma video signal components. For example, a television may be adapted to receive a composite video input and utilize an integrated comb filter to separate the chroma and luma video signal components. However, before the television can display the received video signal, the chroma and luma video components have to be separated.

FIG. 1 is a diagram illustrating generation of a conventional composite video signal. Referring to FIG. 1, a conventional composite video signal 105 may be generated from a luma component 103 and a chroma component 101. The composite video signal 105 may be generated by adding the chroma video signal component 101 and the luma video signal component 103. The chroma signal component 101 may be modulated at 3.58 MHz for a NTSC signal and 4.43 MHz for a PAL signal. The chroma signal component 101 may or may not comprise a constant chroma across the entire line. The luma signal component 103 may increase in amplitude in a stair step fashion or it may not.

FIG. 2A is a diagram illustrating modulated chroma signals in contiguous composite video frames in a NTSC video signal. The chroma component may be modulated so that a frequency of each successive line of video may be phase-shifted by 180 degrees with respect to the previous line. Referring to FIG. 2A, the previous frame 201 may comprise a previous line 203, a current line 205, and a next line 207. Similarly, the current frame 209 may comprise a previous line 211, a current line 213, and a next line 215. The current line 213 in the current frame 209 may be phase-shifted by 180 degrees from the previous line 211 in the current frame 209, as well as from the next line 215 in the current frame 209. Similarly, the current line 205 in the previous frame 201 may be phase-shifted by 180 degrees from the previous line 203 in the previous frame 201, as well as from the next line 207 in the previous frame 201. In addition, since frames in the contiguous composite video signal are at a frequency rate of 59.94 Hz, there may be a 180-degree phase shift between two adjacent frames, for example, the current frame 209 and the previous frame 201. Correspondingly, the current line 213 in the current frame may be 180 degrees phase-shifted from the current line 205 in the previous frame 201.

In conventional video processing, there are three ways to separate the luma and chroma video components in a NTSC video signal and these include combing horizontally, combing vertically, and combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma video components in a NTSC video signal is by horizontal combing. Horizontal combing may be accomplished by utilizing a notch filter, for example. Since the chroma signal component in a NTSC composite video signal may be modulated at 3.58 MHz, a notch filter set at 3.58 MHz may be utilized. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, which involves combing only within one field at a time and without any temporal combing.

During combing in the current frame 209, for example, if the current line 213 is added to the previous line 211, the chroma content may cancel out and two times the luma content may be obtained. On the other hand, if the previous line 211 is subtracted from the current line 213, the luma content may cancel out and two times the chroma content may be obtained. In this way, luma and chroma content may be separated from the composite video signal for further processing. However, vertical combing may result in a reduced vertical bandwidth.

A third way to comb a NTSC composite video signal is to comb temporally. Combing temporally comprises combing between two adjacent frames, for example, the current frame 209 and the previous frame 201. Further, temporal combing may be characterized by a reduced temporal bandwidth. Luma and chroma content may be separated by utilizing the same addition and subtraction method between a current line and a previous line as it was utilized with vertical combing.

FIG. 2B is a diagram illustrating modulated chroma signals in a composite video frame in a PAL video signal. The chroma component in a PAL video signal, for example, may be modulated so that a frequency of each successive line of video may be phase-shifted by 90 degrees with respect to the two lines previous. Referring to FIG. 2B, the current frame 221 may comprise two lines previous 223, a current line 225, and two lines next 227. The current line 225 in the current frame 221 may be phase-shifted by 180 degrees from the two lines previous 223 as well as from the two lines next 227 in the current frame 221. In this regard, the two lines previous 223 and the two lines next 227 are in phase.

In conventional video processing of a PAL video signal, there are two ways to separate the luma and chroma video components and these include combing horizontally and combing vertically. During separation of the luma and chroma components, there are two bandwidth directions that may incur losses in the separation process and in the separated signal. Depending on the combing method that is utilized, the separated signal may have reduced vertical bandwidth and/or horizontal bandwidth.

The first way to separate the luma and chroma video components in a PAL video signal is by horizontal combing. Horizontal combing may be accomplished by utilizing a notch filter, for example. Since the chroma signal component in a composite video signal may be modulated at 4.43 MHz, a notch filter set at 4.43 MHz may be utilized. Combing vertically may also be utilized to separate the luma and chroma video components in a PAL video signal. Combing vertically may be achieved in three different ways—the current line may be combed with two lines previous and two lines next, the current line may be combed with two lines previous, or the current line may be combed with two lines next. The vertical combing is performed spatially, which involves combing only within one field at a time and without any temporal combing.

During combing in the current frame 221, for example, if the current line 225 is added to two lines previous 223, the chroma content may cancel out and two times the luma content may be obtained. On the other hand, if two lines previous 223 is subtracted from the current line 225, the luma content may cancel out and two times the chroma content may be obtained. In this way, luma and chroma content may be separated from the PAL composite video signal for further processing. However, vertical combing in this manner may result in reduced vertical bandwidth.

FIG. 2C is a diagram illustrating combing of a correlated current line and a previous line in a current frame in a NTSC video signal. In this case, there is no vertical bandwidth and the previous line and the current line are perfectly correlated. The current line may be added with the previous line and two times luma may be obtained. Similarly, the previous line may be subtracted from the current line so that two times chroma may be obtained.

FIG. 2D is a diagram illustrating combing of a correlated current line and two lines previous in a current frame in a PAL video signal. In this case, there is no vertical bandwidth and the two lines previous and the current line are perfectly correlated. The current line may be added with the two lines previous and two times luma may be obtained. Similarly, the two lines previous may be subtracted from the current line so that two times chroma may be obtained.

FIG. 2E is a diagram illustrating combing of a non-correlated current line and a previous line in a current frame in a NTSC video signal. In this case, there may be significant vertical bandwidth. The vertical bandwidth may be high enough so that there may be no correlation between the current line and the previous line. When the current line and the previous line are combed together, there may be significant error in both the luma and chroma. This may produce combing artifacts in the obtained combed video signal. A substantially the same result may be obtained when combing temporally when there is temporal bandwidth, which indicates motion. Higher bandwidth in a given direction may cause combing in that direction to result in more incorrectly separated luma and chroma.

FIG. 2F is a diagram illustrating combing of a non-correlated current line and two lines previous in a current frame in a PAL video signal. In this case, there may be significant vertical bandwidth. The vertical bandwidth may be high enough so that there may be no correlation between the current line and the two lines previous. When the current line and the two lines previous are combed together, there may be significant error in both the luma and chroma. This may produce combing artifacts in the obtained combed PAL video signal. Higher bandwidth in a given direction may cause combing in that direction to result in more incorrectly separated luma and chroma.

During combing of a PAL or NTSC composite video signal, a luma component may be incorrectly determined to be chroma. As a result of the incorrectly characterized luma, a resulting combed PAL or NTSC video signal may look soft with insufficient sharpness and crispness.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for correlation sharpening filtering of a composite video signal. More specifically, certain aspects of the invention may be found in a method for separating luma and chroma components in a composite video signal. A correlation between a current pixel and at least one adjacent pixel may be determined. A plurality of chroma video signal components of a composite video signal may be blended based on the determined correlation. A luma video signal component may be determined based on the blended chroma video signal components. At least a portion of the plurality of chroma video signal components may be filtered, resulting in filtered chroma video signal. At least a portion of the plurality of chroma video signal components may be blended with the filtered chroma video signal based on the determined correlation. The blended at least a portion of the plurality of chroma video signal components may be removed from the composite video signal to obtain the luma video signal component. The plurality of chroma video signal components may be narrow band pass filtered. The composite video signal may be a PAL composite video signal and/or a NTSC composite video signal.

Another aspect of the invention may provide a machine-readable storage, having stored thereon, a computer program having at least one code section executable by a machine, thereby causing the machine to perform the steps as described above for correlation sharpening filtering of a composite video signal.

The system for correlation sharpening filtering of a composite video signal may include first circuitry that determines a correlation between a current pixel and at least one adjacent pixel. Second circuitry may blend a plurality of chroma video signal components of a composite video signal based on the determined correlation. Third circuitry may determine a luma video signal component based on the blended chroma video signal components. A filter may filter at least a portion of the plurality of chroma video signal components resulting in filtered chroma video signal. The first circuitry may comprise chroma decision circuitry. The second circuitry may comprise blending circuitry. The third circuitry may comprise separation circuitry. The second circuitry may blend at least a portion of the plurality of chroma video signal components and the filtered chroma video signal based on the determined correlation. The third circuitry may remove the blended at least a portion of the plurality of chroma video signal components from the composite video signal to obtain the luma video signal component. The filter may narrow band pass filter the plurality of chroma video signal components. The composite video signal may be a PAL composite video signal and/or a NTSC composite video signal. The third circuitry may comprise a processor.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for correlation sharpening filtering of a NTSC or a PAL composite video signal. During separation of the chroma and luma video components in a NTSC or a PAL composite video signal feed, combing horizontally, combing vertically and/or combing temporally may be utilized to achieve the chroma and luma separation. During combing of a PAL or NTSC composite video signal, a luma component may be incorrectly characterized as chroma, which may result in reduced sharpness of the combed video signal. A correlation sharpening filter may be utilized to reduce mischaracterization of luma and increase sharpness in a combed video signal.

A correlation blend factor (CBF) may be determined between a current pixel and one or more adjacent pixels in a PAL or NTSC composite video signal. A chroma video signal component obtained, for example, from an adaptive 2D and/or 3D comb, may be blended with a filtered chroma video signal component. The blending between the two chroma components may be based on the determined CBF. The CBF may be utilized as a confidence factor so that the CBF may indicate whether luma may have been mischaracterized as chroma, and if so, to what extent. If CBF indicates low confidence, the chroma signal may be limited by a narrow band pass filter, for example. A luma video signal component may be determined based on the blended chroma video signal components. For example, the blended chroma component may be subtracted from the NTSC or PAL composite video signal to obtain the luma component.

Figure 1:
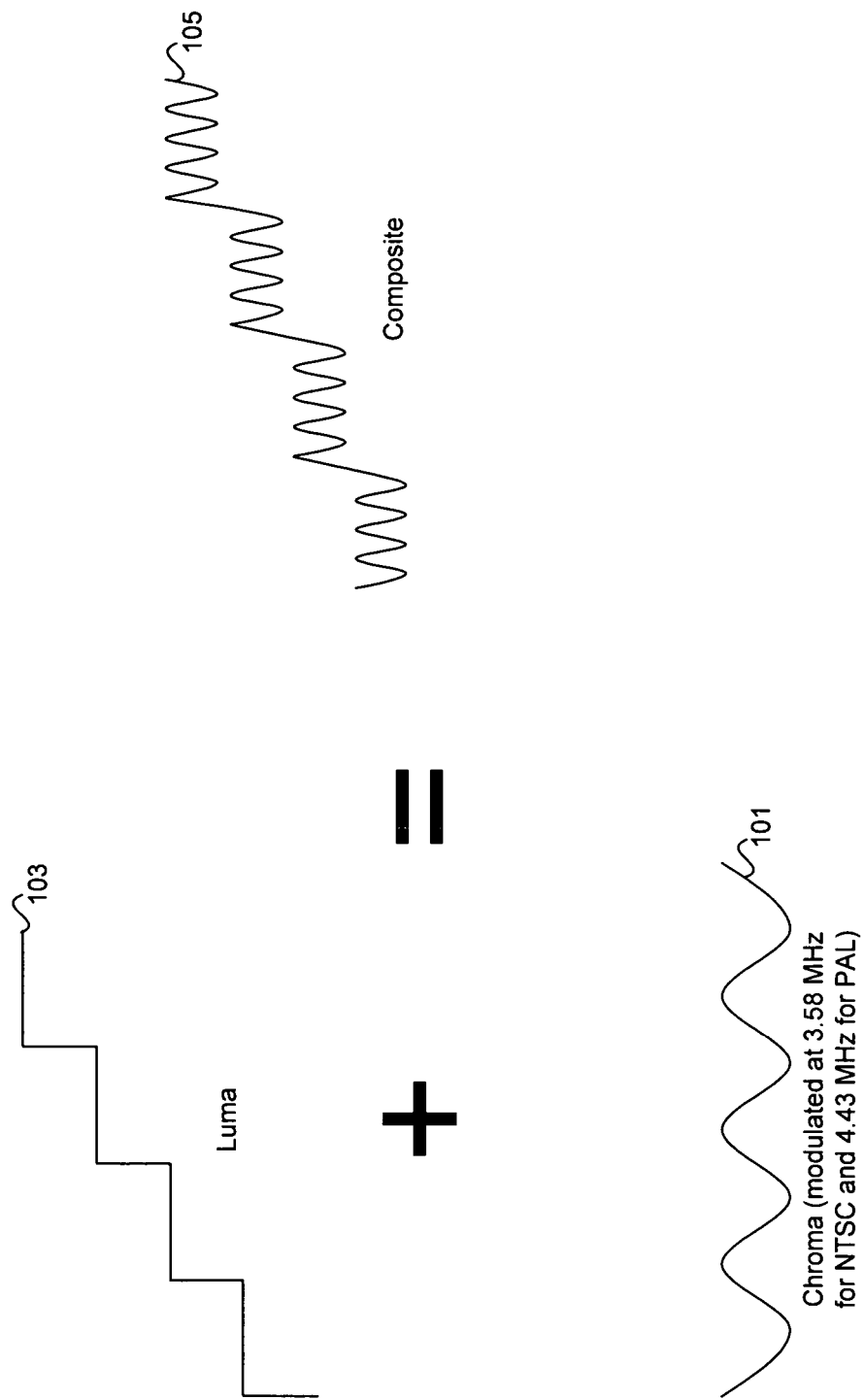
FIG. 1 is a diagram illustrating generation of a conventional composite video signal.
Figure 2A:
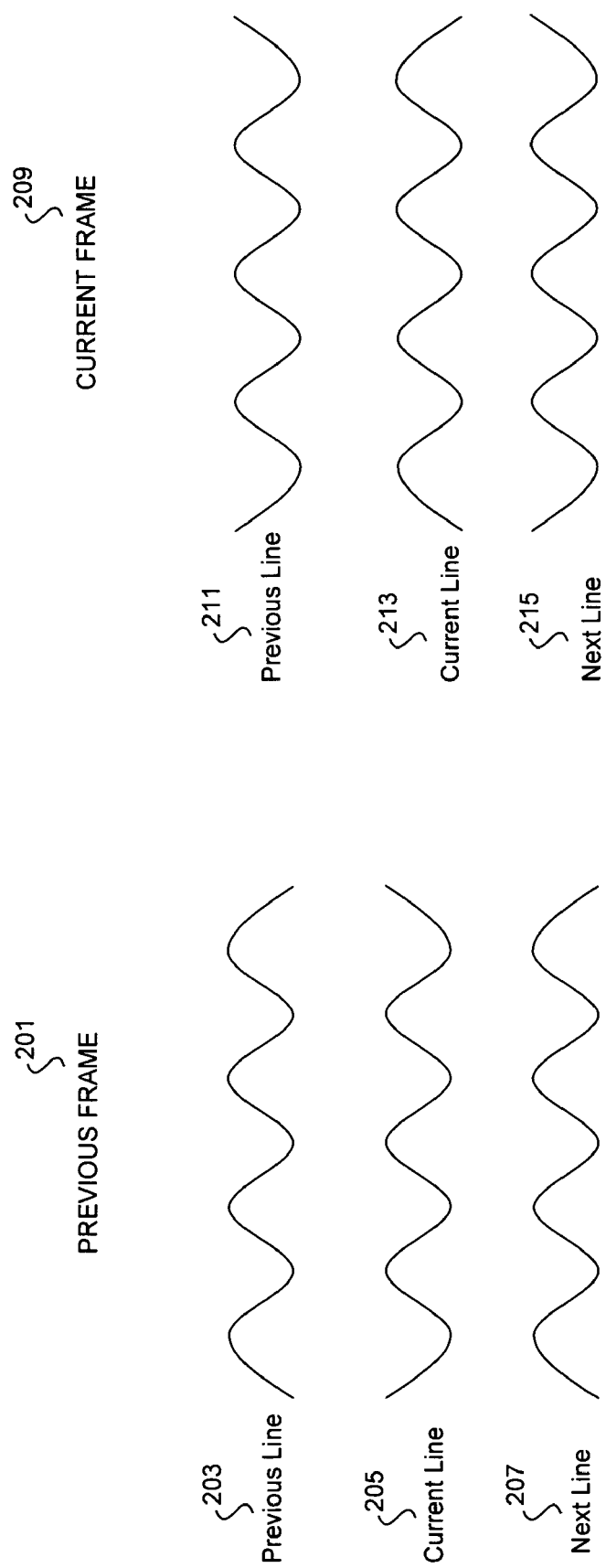
FIG. 2A is a diagram illustrating modulated chroma signals in contiguous composite video frames in a NTSC video signal.
Figure 2B:
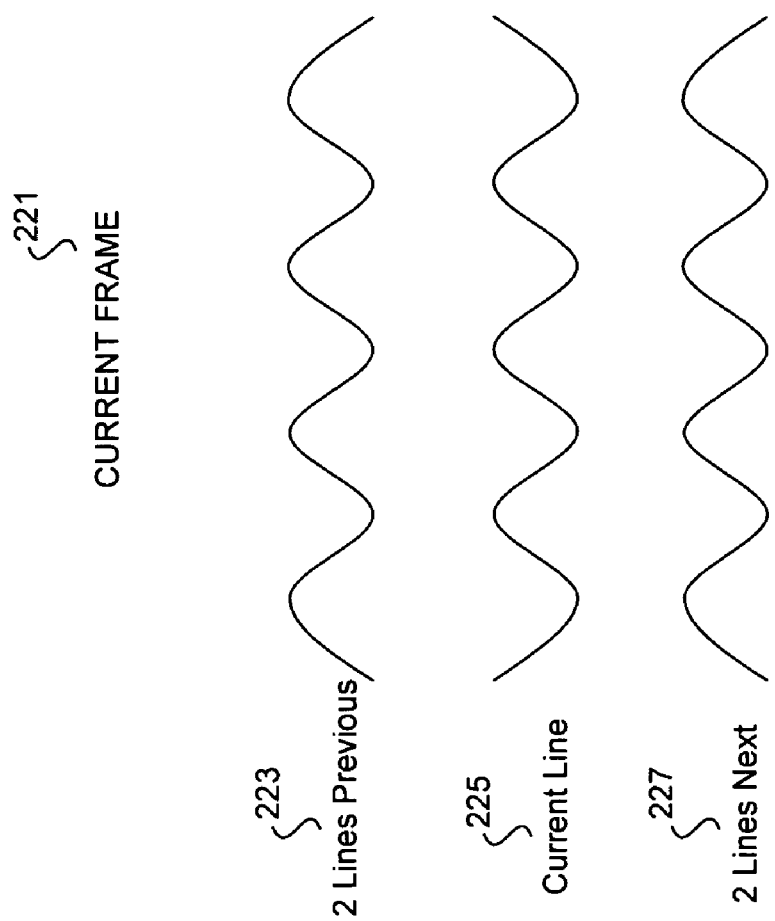
FIG. 2B is a diagram illustrating modulated chroma signals in a composite video frame in a PAL video signal.
Figure 2C:
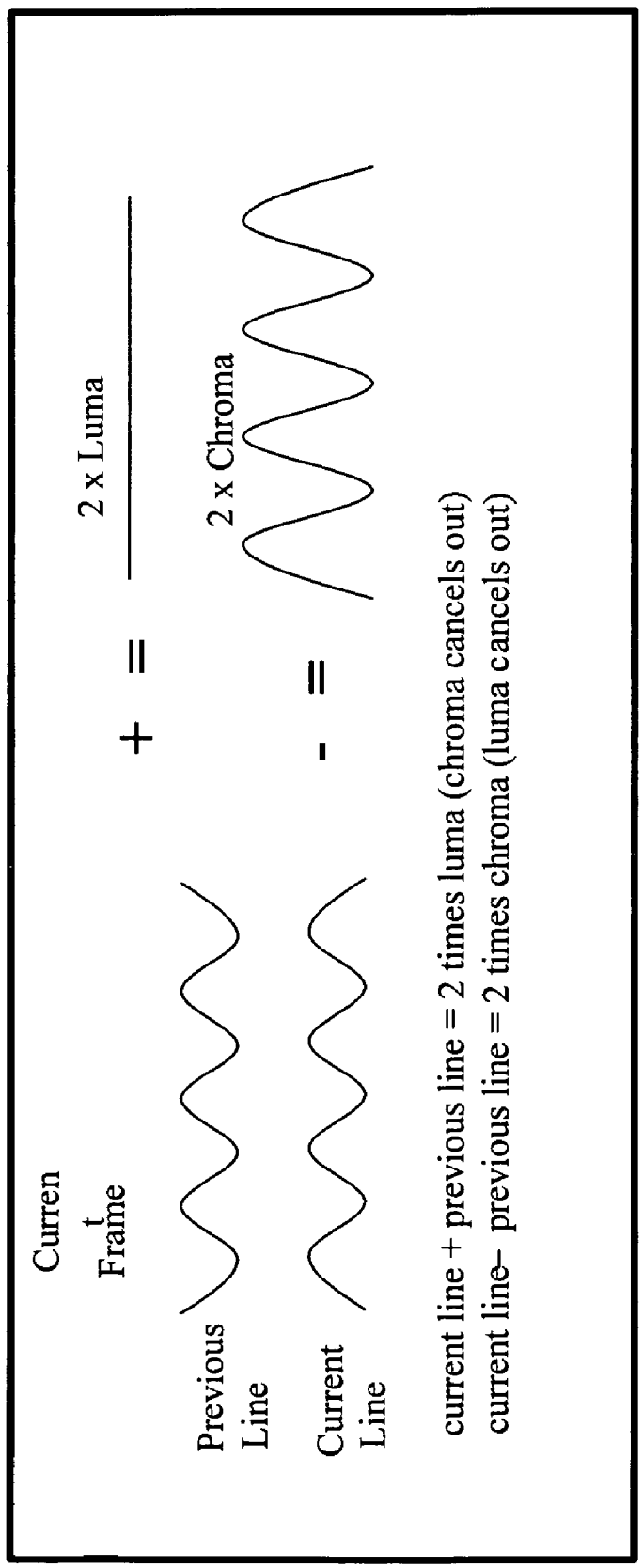
FIG. 2C is a diagram illustrating combing of a correlated current line and a previous line in a current frame in a NTSC video signal.
Figure 2D:
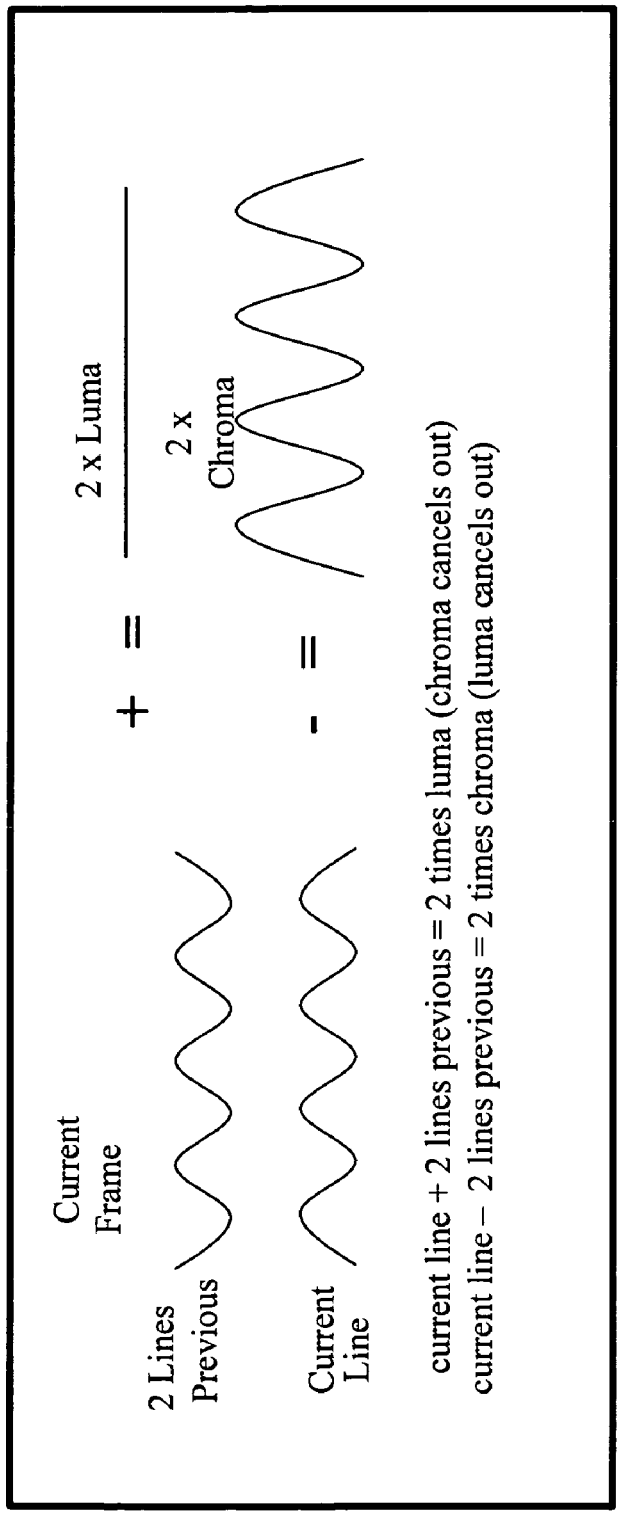
FIG. 2D is a diagram illustrating combing of a correlated current line and two lines previous in a current frame in a PAL video signal.
Figure 2E:
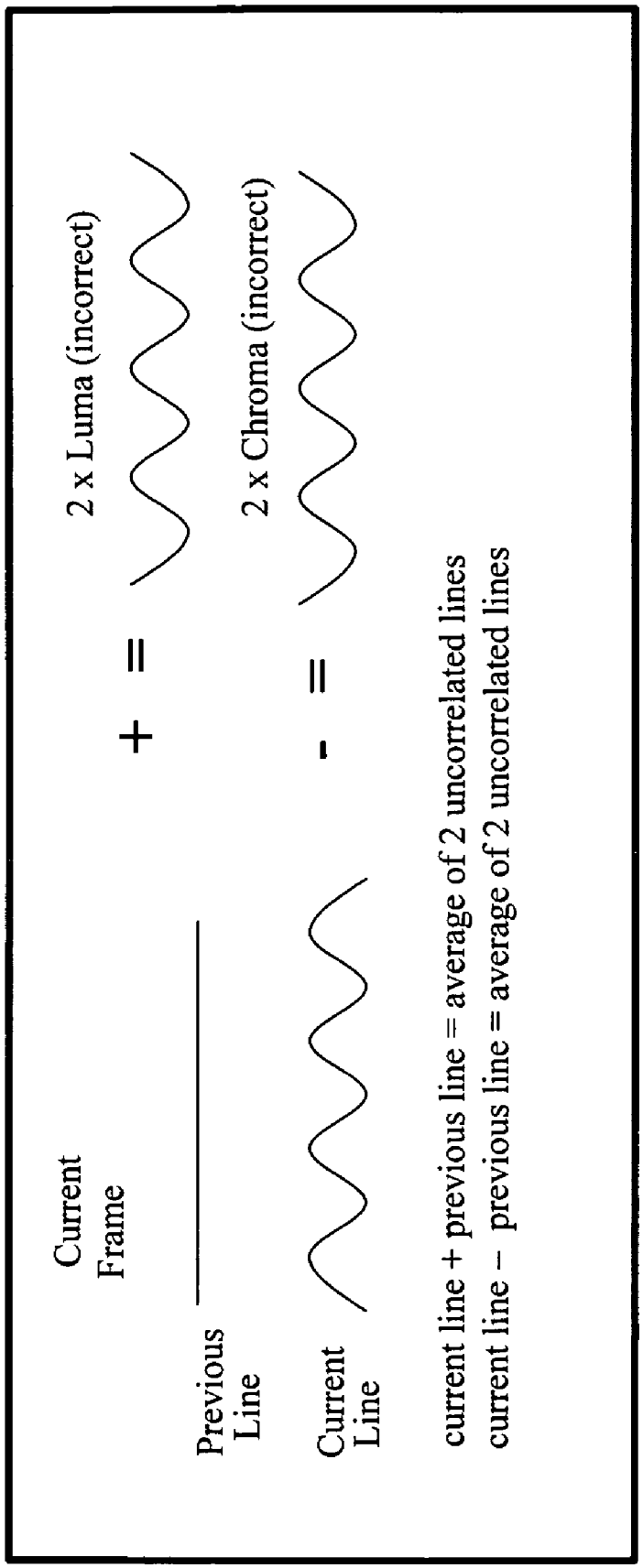
FIG. 2E is a diagram illustrating combing of a non-correlated current line and a previous line in a current frame in a NTSC video signal.
Figure 2F:
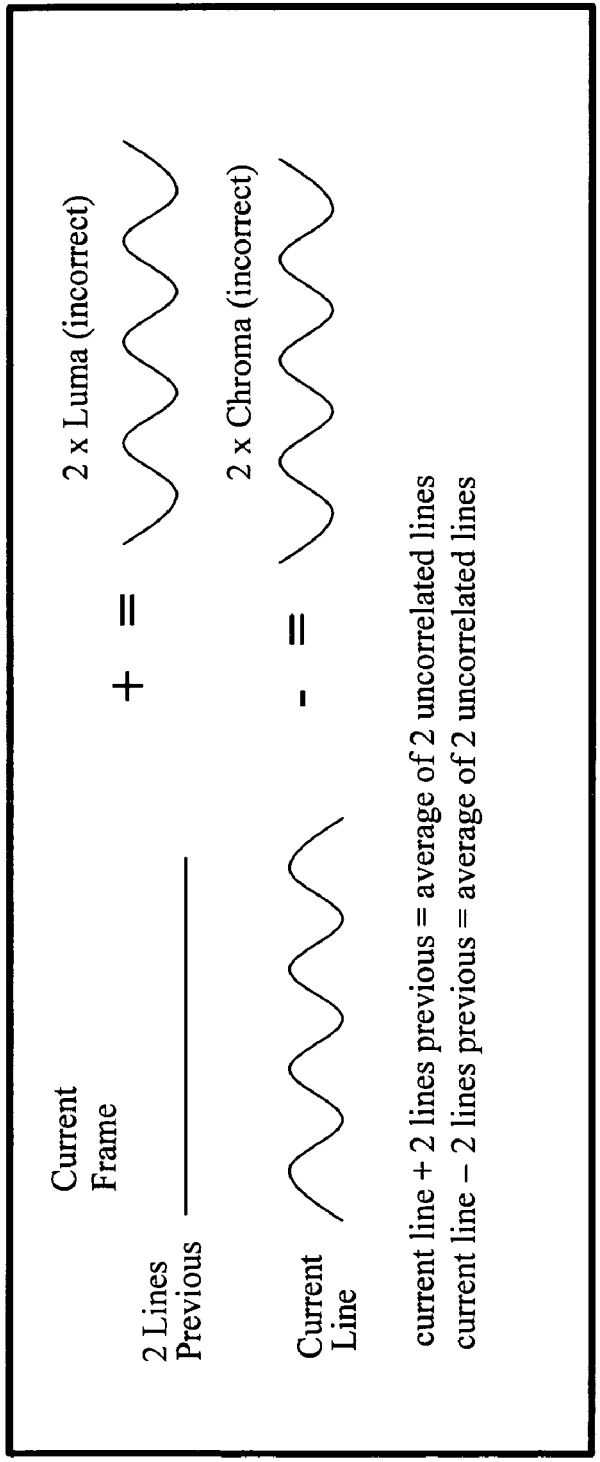
FIG. 2F is a diagram illustrating combing of a non-correlated current line and two lines previous in a current frame in a PAL video signal.
Figure 3A:
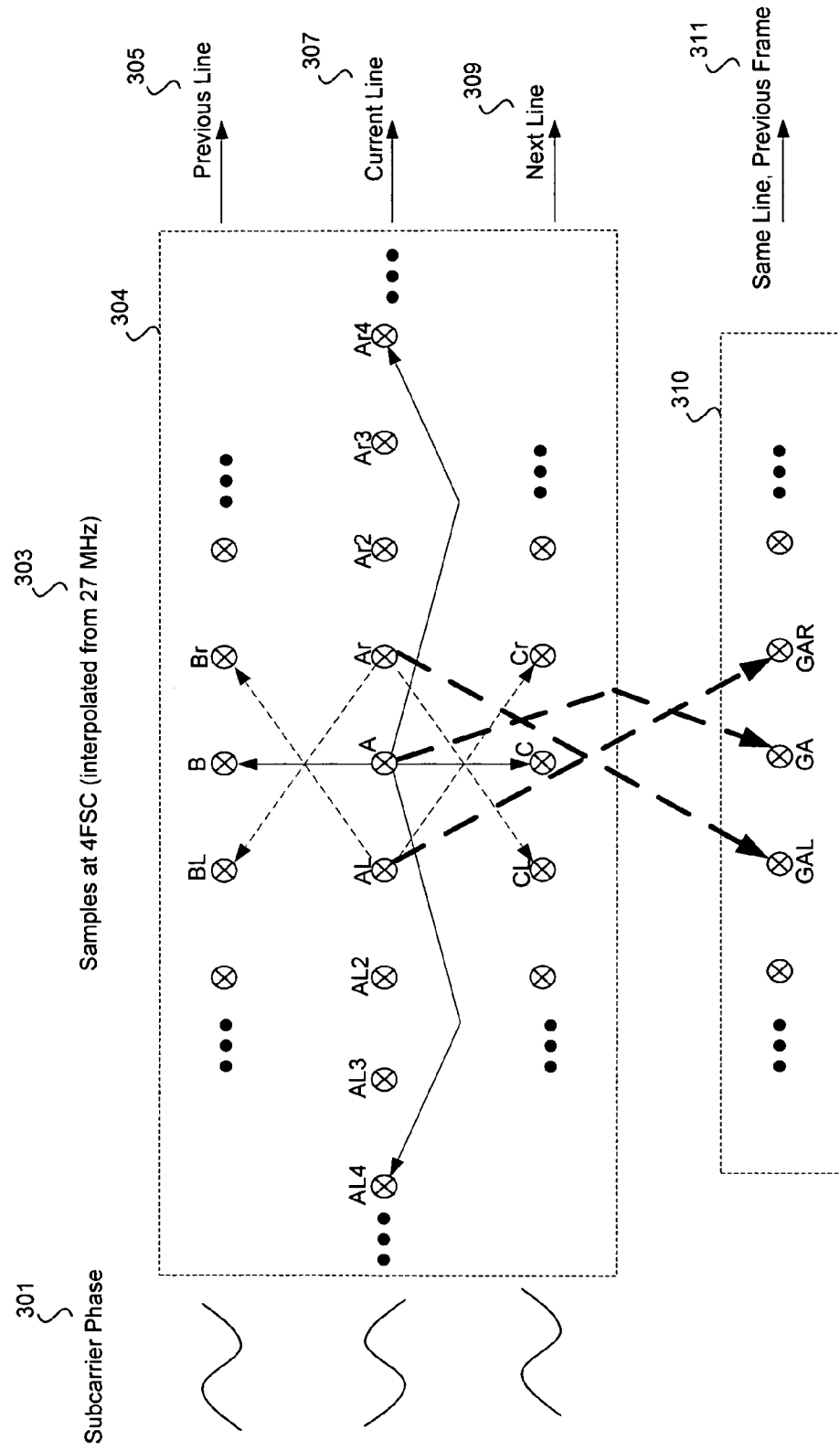
FIG. 3A is a diagram illustrating 2D and 3D comb filtering of a NTSC video signal, in accordance with an embodiment of the invention.

FIG. 3A is a diagram illustrating 2D and 3D comb filtering of a NTSC video signal, in accordance with an embodiment of the invention. Referring now to FIG. 3A, there is illustrated a sample of pixels from three adjacent lines in a current frame 304, a current line 307, a previous line 305, and a next line 309, as well as a same (current) line 311 but in a previous frame 310. The subcarrier phase 301 of the incoming NTSC composite video signal may be 3.58 MHz, and the incoming analog video signal may be digitized at 27 MHz, for example. Since 3.58 MHz and 27 MHz are not multiples of each other, there may not be an exact pixel sample every 3.58 MHz of digitized video signal that is aligned and in-phase. For example, it may be difficult to compare the peak of a sine wave on the current line 307 with the peak of a sine wave on the next line 309, since a pixel sample may not be obtained at the 27 MHz frequency. The composite video signal, therefore, may be run through a filter that interpolates pixel samples 303 at four times the frequency of the sub-carrier. For example, if the subcarrier frequency is at 3.58 MHz, the pixel samples 303 may be interpolated at 14.32 MHz for a NTSC video signal.

Pixels A, B and C may be true sample pixels. However, all the remaining pixels to the left and to the right of the true sample pixels A, B and C, such as pixels BL, Br, AL, AL2, AL3, AL4, Ar, Ar2, Ar3, Ar4, CL, and Cr, may be interpolated pixels. In a given line, each pixel may be shifted by a quarter subcarrier cycle from the adjacent pixel. In addition, each line may be 180 degree phase-shifted from its adjacent line. For example, pixel A and interpolated pixel AL4, to the left of pixel A in the current line 307, may be in phase with each other, whereas pixel A and interpolated pixel AL may be quarter cycle phase-shifted from each other. Similarly, interpolated pixel Ar may be a quarter cycle phase-shifted to the right of pixel A, and interpolated pixel Ar4 may be in phase with pixel A. Since the current line 307 may be 180 degrees phase-shifted from either the previous line 305 or the next line 309, pixel A may also be phase-shifted 180 degrees from either pixel B in the previous line 305 or pixel C in the next line 309.

In an embodiment of the present invention, the amount of frequency content movement in a NTSC composite video signal may be approximated between pixels within a given pixel line, between pixel lines within the same video frame, and between similar pixel lines in adjacent frames, and the corresponding combing method may be applied with a minimum bandwidth loss. For example, if vertical combing is applied with regard to pixel A, then pixel A may be subtracted from pixel B resulting in two times the luma, or pixel A may be subtracted from pixel C to obtain two times the luma, or pixel A may be subtracted from the average of B and C to obtain two times the luma. The same process may be performed between pixel A and interpolated pixel AL2, since they are out of phase The phase difference between pixels A and B is 180 degrees, which is the same as between pixel A and interpolated pixel AL2. In order to determine whether vertical combing may be applied without significant bandwidth loss, pixels in the current line 307 and the previous line 305 may be compared. For example, interpolated pixel AL in the current line 307 may be compared with interpolated pixel Br in the previous line 305, where interpolated pixel AL is in phase with interpolated pixel Br since there is 360 degree phase difference between them. Similarly, interpolated pixel Ar may be compared with interpolated pixel BL, where interpolated pixel Ar is in phase with interpolated pixel BL since there is 360 degrees phase difference between them as well.

If these two comparisons indicate a big difference, this may be indicative of significant vertical frequency content going from B to A. If the difference between the interpolated pixels in the two comparisons is small, then this may indicate that there is not a lot of vertical frequency content. Accordingly, vertical combing may be applied between the current line 307 and the previous line 305 without a significant bandwidth loss. Similarly, comparisons between the interpolated pixels AL and Cr, and Ar and CL may be indicative of whether vertical combing may be applied between the current line 307 and the next line 309, without a significant bandwidth loss. Depending on the composite video signal, there may be no frequency content between pixel B and pixel A, which indicates that the current line and the previous line are identical lines. A large frequency content between pixel A and pixel C may indicate that a vertical transition has happened immediately after the current line. Conversely, there may be a lot of frequency content between pixel B and pixel A, and no frequency content between pixel A and pixel C. This may be characterized by the fact that the current line and the next line are very similar, but the current line and the previous line are different. In this case, vertical combing may be performed between the current line and the next line.

A final comparison may be performed between pixels A, B and C, in order to determine whether vertical combing may be applied with a minimum bandwidth loss. If pixels A, B and C are, for example, all in phase with each other, this may be indicative that there is no chroma component and pixels A, B and C contain only luma components, for example, if the video signal comprises a white character or a black background. In this case, since there is no frequency content between the current line 307, the previous line 305 and the next line 309, vertical combing may be applied without a significant loss in bandwidth.

With regard to horizontal combing, or notch filtering, pixel A may be compared with interpolated pixels AL4 and Ar4 in the current line 307, which are in phase with pixel A. This may provide an indication of the horizontal frequency content in the current line 307. If pixel A is very different from either of interpolated pixels AL4 or Ar4, it may indicate that there is significant frequency content in the current line 307. If, on the other hand, the pixels are very similar, it may indicate that there is less frequency content and horizontal combing may be applied. In an embodiment of the present invention, a wide band pass filter may be utilized in order to horizontally filter a composite signal and eliminate the luma component that is not near the chroma subcarrier frequency, for example, a 3.58 MHz subcarrier frequency.

In yet a different embodiment of the present invention, 3D combing of a NTSC composite video signal may also be implemented taking into consideration temporal signal comparison for purposes of applying temporal combing with a minimum temporal bandwidth loss. Referring again to FIG. 3A, pixels in the same line/previous frame 311 may be considered. For example, GA may be an actual pixel similar to pixel A, but it may be phase-shifted 180 degrees from pixel A in the previous frame. Pixel GA may be the same pixel as pixel A in the previous frame, interpolated pixel GAL may be one quarter of a 3.58 MHz subcarrier frequency off to the left in the previous frame, and interpolated pixel GAR may be one-quarter of a subcarrier cycle off to the right on the same line in the previous frame. Since pixels Ar and GAL are phase-shifted at 360 degrees and are in phase with each other, they may be compared for temporal frequency content.

Similarly, pixels AL and GAR may also be compared for temporal frequency content. If these two comparisons indicate that the pixels are similar, then this may indicate that pixel A is very similar to pixel GA and that there is no temporal frequency content movement from the previous frame. In this case, temporal combing may be performed since there will be no significant temporal bandwidth loss. If, on the other hand, the two comparisons show a large difference, then it may be indicative of a significant temporal frequency content between the current and the previous frame, and temporal combing, therefore, may not be desirable since it may involve temporal bandwidth loss. A comparison between pixel A and pixel GA may be useful in instance where there is a pixel that bears no color, for example, a black and/or a white pixel. Such pixels are characterized only by a luma component and, therefore, have no phase difference between each other. In this case, temporal combing may be applied without any resulting temporal bandwidth loss.

A 3D comb filter in accordance with an embodiment of the present invention, may be implemented by first horizontally combing a composite video signal. The horizontal combing may be accomplished by running the composite video signal through a very wide band pass filter, for example, so that it may pre-filter the very low frequency luma component within the composite video signal. In this way, if there is very coarse (VC), slow moving luma changes, such VC luma may be eliminated and not be considered in subsequent vertical and/or temporal combing processes. If a subcarrier frequency of 3.58 MHz is utilized, chroma components may be centered around 3.58 MHz, or approximately between 2 and 5 MHz. In other words, any frequency content below 2 MHz may be considered a luma component and may be filtered out by the band pass filter. By performing the corresponding comparisons between pixels, as outlined above, it may be determined whether vertical combing and/or temporal combing may be utilized without significant bandwidth loss. For example, horizontal and vertical combing, or 2D combing, may be the only useful combing methods in one embodiment of the present invention. In another embodiment of the present invention, horizontal, vertical and temporal combing, or 3D combing, may be applied without significant bandwidth loss. A final combing decision as to a specific composite signal may include a blend of 2D and 3D combing. In this case, a certain percentage of a pixel may be only vertically or horizontally combed, and the remaining pixel may be combed vertically and temporally.

Referring again to FIG. 3A, comparisons between in-phase pixels in the same frame and between frames may be utilized to determine the amount of 2D and 3D combing that may be required for optimal combing. To further optimize combing, results from pixel and line comparisons may be low pass filtered before being utilized in a combing decision logic, for example.

Figure 3B:
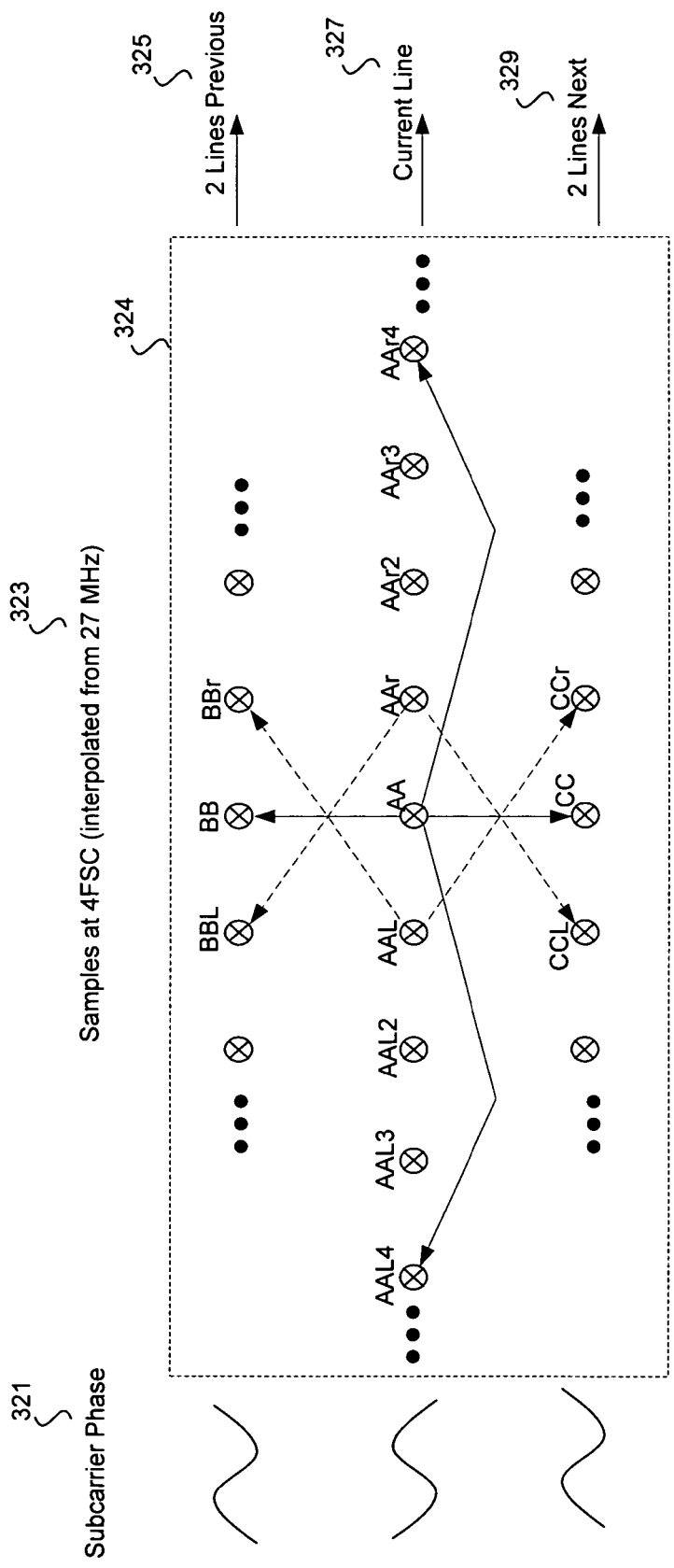
FIG. 3B is a diagram illustrating 2D comb filtering decision logic for a PAL video signal, in accordance with an embodiment of the invention.

FIG. 3B is a diagram illustrating 2D comb filtering decision logic for a PAL video signal, in accordance with an embodiment of the invention. Referring now to FIG. 3B, there is illustrated a sample of pixels from three non-adjacent pixel lines in a current frame 324, a current line 327, two lines previous 325, and two lines next 329. The subcarrier phase 321 of the incoming PAL composite video signal may be 4.43 MHz, and the incoming analog video signal may be digitized at 27 MHz, for example. Since 4.43 MHz and 27 MHz are not multiples of each other, there may not be an exact pixel sample every 4.43 MHz of digitized video signal that is aligned and in-phase. For example, it may be difficult to compare the peak of a sine wave on the current line 327 with the peak of a sine wave on the two lines next 329, since a pixel sample may not be obtained at the 27 MHz frequency. The PAL composite video signal, therefore, may be run through a filter that interpolates pixel samples 323 at four times the frequency of the sub-carrier. For example, if the subcarrier frequency is at 4.43 MHz, the pixel samples 323 may be interpolated at 17.72 MHz.

Pixels M, BB and CC may be true sample pixels. However, all the remaining pixels to the left and to the right of the true sample pixels AA, BB and CC, such as pixels BBL, BBr, ML, ML2, ML3, ML4, Mr, Mr2, Mr3, Mr4, CCL, and CCr, may be interpolated pixels. In a given pixel line, each pixel may be shifted by a quarter subcarrier cycle from the adjacent pixel. In addition, each line may be 90 degree phase-shifted from its adjacent pixel line. For example, pixel M and interpolated pixel ML4, to the left of pixel M in the current line 327, may be in phase with each other, whereas pixel M and interpolated pixel ML may be quarter cycle phase-shifted from each other. Similarly, interpolated pixel Mr may be a quarter cycle phase-shifted to the right of pixel M, and interpolated pixel Mr4 may be in phase with pixel M. Since the current line 327 may be 180 degrees phase-shifted from either the two lines previous 325 or the two lines next 329, pixel A may also be phase-shifted 180 degrees from either pixel BB in the two lines previous 325 or pixel C in the two lines next 329.

In an embodiment of the present invention, the amount of frequency content movement in a PAL video signal may be approximated between pixels within a given pixel line and between non-adjacent pixel lines within the same video frame, and the corresponding combing method may be applied with a minimum bandwidth loss. For example, if vertical combing is applied with regard to pixel M, then pixel AA may be subtracted from pixel BB resulting in two times the luma, or pixel AA may be subtracted from pixel CC to obtain two times the luma, or pixel M may be subtracted from the average of BB and CC to obtain two times the luma. The same process may be performed between pixel AA and interpolated pixel AAL2, since they are out of phase. The phase difference between pixels AA and BB is 180 degrees, which is the same as between pixel M and interpolated pixel ML2. In order to determine whether vertical combing may be applied for a PAL video signal without a significant bandwidth loss, pixels in the current line 327 and the two lines previous 325 may be compared. For example, interpolated pixel ML in the current line 327 may be compared with interpolated pixel BBr in the two lines previous 325, where interpolated pixel ML is in phase with interpolated pixel BBr since there is 360 degree phase difference between them. Similarly, interpolated pixel Mr may be compared with interpolated pixel BBL, where interpolated pixel Mr is in phase with interpolated pixel BBL since there is 360 degrees phase difference between them as well.

If these two comparisons indicate a big difference, this may be indicative of significant vertical frequency content going from pixel BB to M. If the difference between the interpolated pixels in the two comparisons is small, then this may indicate that there is not a lot of vertical frequency content in the PAL composite video signal. Accordingly, vertical combing may be applied between the current line 327 and the two lines previous 325 without a significant bandwidth loss. Similarly, comparisons between the interpolated pixels ML and CCr, and Mr and CCL may be indicative of whether vertical combing may be applied between the current line 327 and the two lines next 329, without a significant bandwidth loss. Depending on the composite video signal, there may be no frequency content between pixel BB and pixel AA, which indicates that the current line and the two lines previous are identical lines. A large frequency content between pixel AA and pixel CC may indicate that a vertical transition has happened immediately after the current line. Conversely, there may be a lot of frequency content between pixel BB and pixel M, and no frequency content between pixel AA and pixel CC. This may be characterized by the fact that the current line and the two lines next are very similar, but the current line and the two lines previous are different. In this case, vertical combing may be performed between the current line and the two lines next.

A final comparison may be performed between pixels AA, BB and CC, in order to determine whether vertical combing may be applied for a PAL video signal with a minimum bandwidth loss. If pixels AA, BB and CC are, for example, all in phase with each other, this may be indicative that there is no chroma component and pixels AA, BB and CC contain only luma components, for example, if the video signal comprises a white character or a black background. In this case, since there is no frequency content between the current line 327, the two lines previous 325 and the two lines next 329, vertical combing may be applied without a significant loss in bandwidth.

With regard to horizontal combing, or notch filtering of a PAL video signal, pixel M may be compared with interpolated pixels ML4 and Mr4 in the current line 327, which are in phase with pixel AA. This may provide an indication of the horizontal frequency content in the current line 327. If pixel AA is very different from either of interpolated pixels AAL4 or AAr4, it may indicate that there is significant frequency content in the current line 327. If, on the other hand, the pixels are very similar, it may indicate that there is less frequency content and horizontal combing may be applied. In an embodiment of the present invention, a wide band pass filter may be utilized in order to horizontally filter a composite signal and eliminate the luma component that is not near the chroma subcarrier frequency, for example, a 4.43 MHz subcarrier frequency.

Figure 3C:
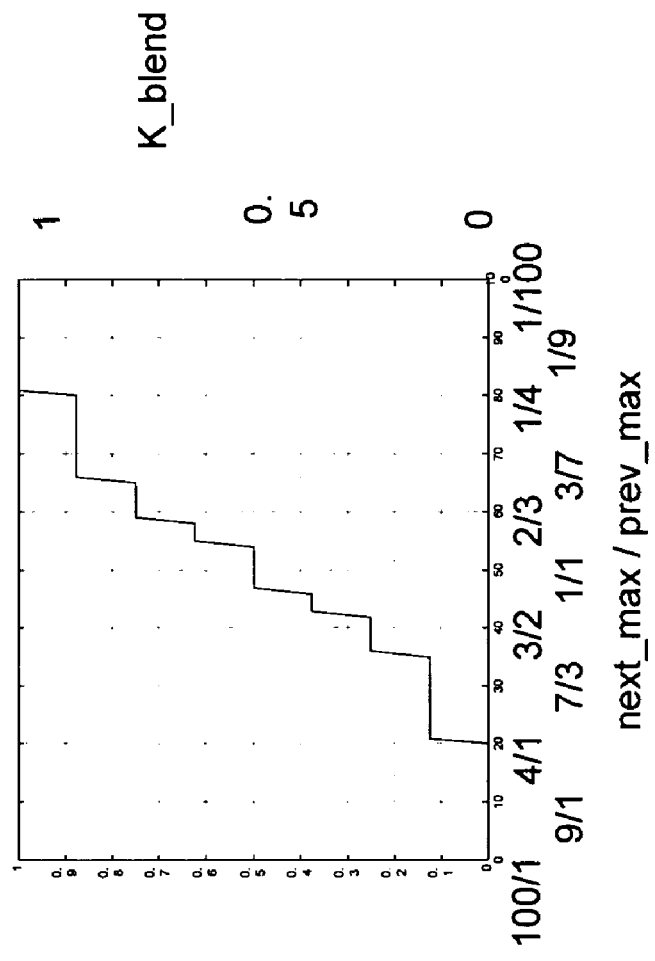
FIG. 3C is a diagram of a blending decision factor related to blending to previous line or two lines previous versus blending to next line or two lines next, in accordance with an embodiment of the invention.

FIG. 3C is a diagram of a blending decision factor related to blending to previous line or two lines previous versus blending to next line or two lines next, in accordance with an embodiment of the invention. Referring to FIG. 3C, a decision as to the quality of combing with the previous line for a NTSC signal, or two lines previous for a PAL signal, versus combing with the next line for a NTSC signal, or two lines next for a PAL signal, may be accomplished by calculating a ratio k_blend. The ratio k_blend may be calculated as a previous line, or two lines previous, comparison to the next line, or two lines next, for example. The k_blend ratio may be calculated using comparisons and constant multiplies so that it is a value between zero and one. The k_blend ratio may be a non-linear ratio between the comparison of bandwidth between a current line to the previous line, or two line previous, and the comparison to the next line, or two lines next, respectively. A constant value in the k_blend calculation may be utilized to bias strongly against luma only comparisons. In the case of low chroma it may not be desirable to falsely pass the luma only condition. K_blend may be calculated as a function of next_max and prev_max. Next_max may be utilized as a measure of the bandwidth difference between a current line and a next line, or two lines next, for example. Prev_max may be utilized as a measure of the bandwidth difference between a current line and a previous line, or two lines previous, for example. K_blend may be a function of the ratio of prev_max to next_max. The larger the ratio, the smaller the value of k_blend. The previous and next lines for a NTSC signal, or two lines previous and two lines next for a PAL signal, may be alpha blended together to comb with the current line. The blend may skew toward next_line when next_max/prev_max ratio is small, and skew toward prev_line when prev_max/next_max ratio is small.

In one aspect of the invention, a different blending decision factor may be determined. A notch filter may be utilized for horizontal combing of a NTSC or a PAL video signal. In order to obtain a better combing decision, a notch filter may be compared to a vertical comb filter by calculating a ratio of the quality of the vertical comb using the previous line, to the quality of the horizontal comb. A different ratio my be related to the quality of the vertical comb using the next line for a NTSC signal, or two lines next for a PAL signal, to the quality of the horizontal comb.

Figure 3D:
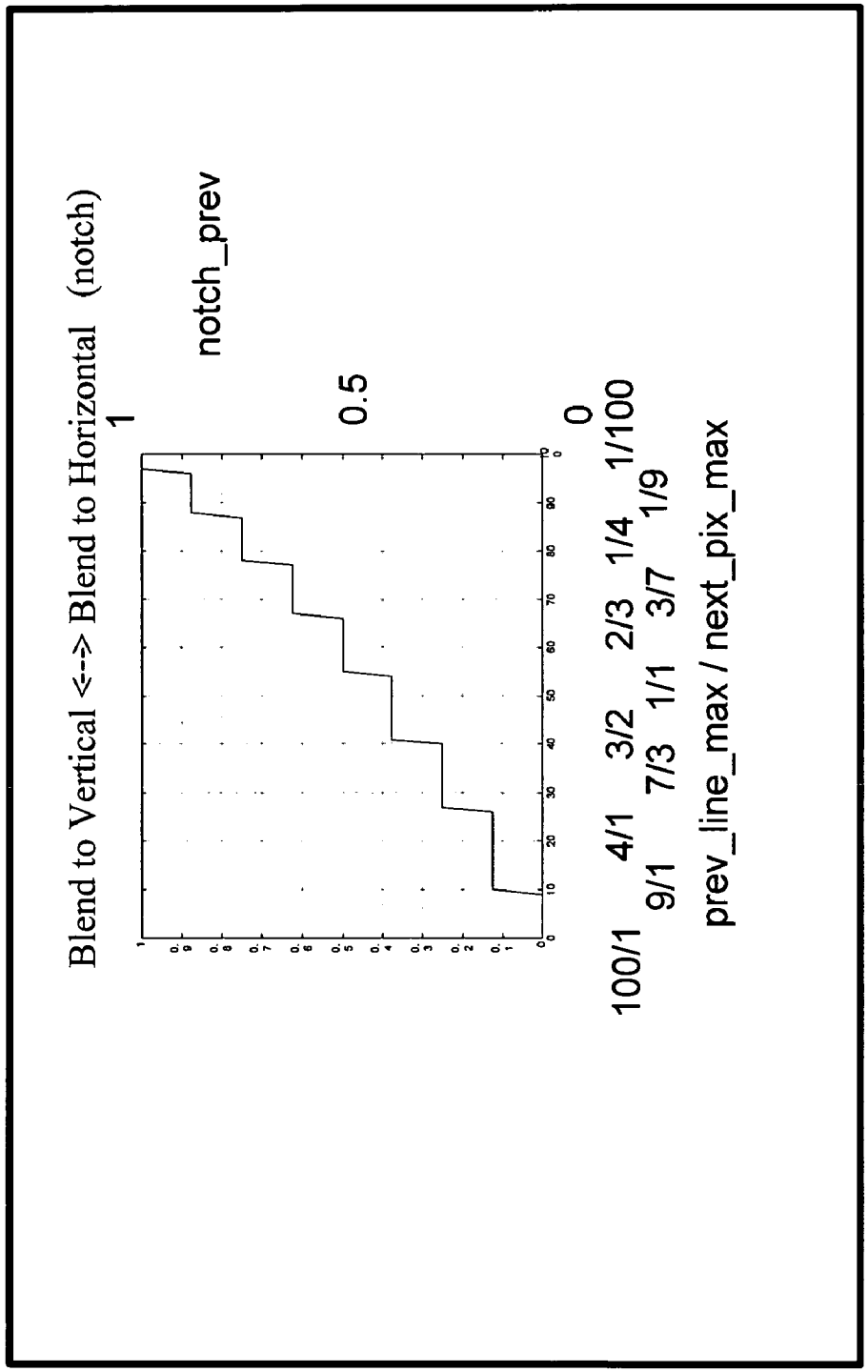
FIG. 3D is a diagram of a blending decision factor related to blending vertically versus blending horizontally in a NTSC or a PAL video signal, in accordance with an embodiment of the invention.

FIG. 3D is a diagram of a blending decision factor related to blending vertically versus blending horizontally in a PAL or NTSC video signal, in accordance with an embodiment of the invention. Referring now to FIG. 3D, a blending decision factor may be determined from a ratio notch_prev, where notch_prev may indicate whether to blend vertically and/or horizontally between a current line and a previous line or two lines previous. Notch_prev may be determined as a function of prev_line_max and next_pix_max. Prev_line_max may be a measure of the bandwidth difference between a current line and a previous line. Next_pix_max may be a measure of the bandwidth difference between two sets of in-phase pixels in a current line. A higher notch_prev ratio may indicate a preference towards notching versus vertical blending.

A notch_next ratio (not illustrated) may be determined in a similar way, where notch_next may indicate whether to blend vertically and/or horizontally between a current line and a next line for a NTSC signal, and two lines next for a PAL signal. A final notch ratio may be determined as a function of the notch_prev and notch_next ratios in order to obtain a blending decision factor related to blending vertically versus blending horizontally. For example, a final notch value for each pixel may be determined by the following equation:

$$\text{notch} = \text{notch\_next} \cdot k\_\text{blend} + \text{notch\_prev} \cdot (1 - k\_\text{blend})$$

Conceptually, if the k_blend combing decision tends towards combing with the top line, the top line may be given more weight in judging the relative goodness of notching. If the k_blend combing decision tends towards combing with the bottom line, the bottom line may be given more weight in judging the relative goodness of notching.

In cases of significantly more luma than chroma at a given point in a NTSC or a PAL composite signal, a notch filter may be gradually disabled. This is because the notch filter tends to filter the luma and leave the remaining signal in chroma. If the combed NTSC or PAL signal is mostly luma, it may be inefficient to allow notching as mostly chroma may remain.

Figure 3E:
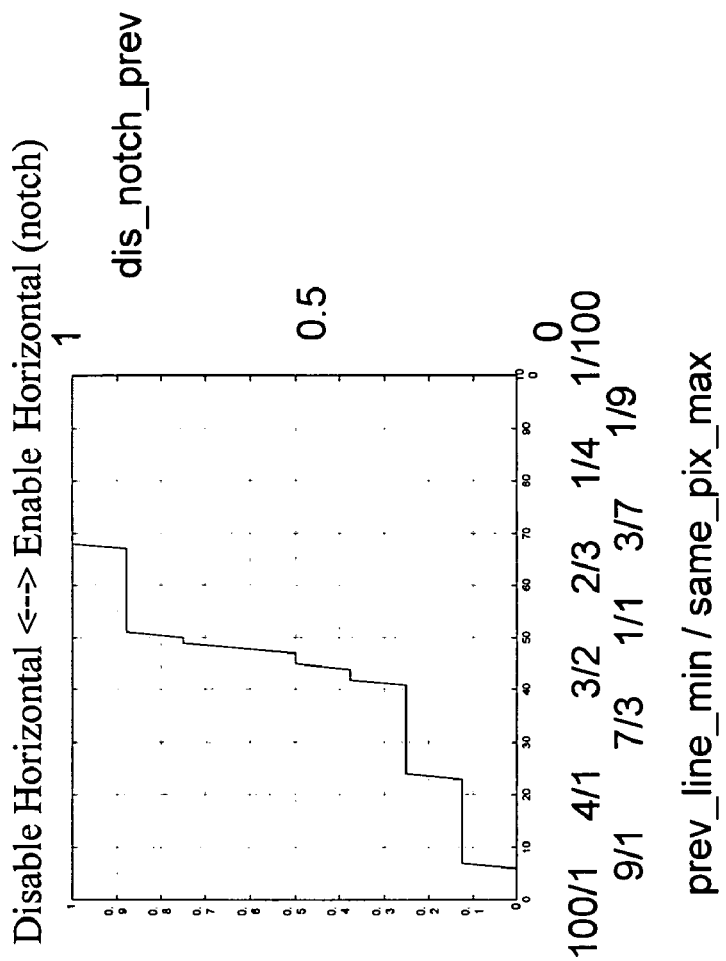
FIG. 3E is a diagram of a blending decision factor related to enabling horizontal combing versus disabling horizontal combing in a NTSC or a PAL video signal, in accordance with an embodiment of the invention.

FIG. 3E is a diagram of a blending decision factor related to enabling horizontal combing versus disabling horizontal combing in a NTSC or a PAL video signal, in accordance with an embodiment of the invention. Referring now to FIG. 3E, a disable notch signal dis_notch_prev may be generated by a ratio of the previous/next line, or two lines previous/two lines next for a PAL signal, comparison with the previous/next line, or two lines previous/two lines next, luma only comparison, respectively. If the point is mostly luma, the luma only comparison will be much smaller than the in phase comparison, respectively. Dis_notch_prev may be determined as a ratio between prev_line_min and same_pix_max, for example. Prev_line_min may be associated with a bandwidth difference between in-phase pixels in a current and previous lines for a NTSC signal, or two lines previous for a PAL signal. Same_pix_max may be associated with a bandwidth difference between out-of-phase pixels in a current, previous and next line for a NTSC signal, and current, two lines previous and two lines next for a PAL signal.

Similarly, a dis_notch_next may be determined as a ratio between next_line_min and same_pix_max, for example, where next_line_min may be associated with a bandwidth difference between in-phase pixels in a current and next lines for a NTSC signal, and two lines next for a PAL signal. Dis_notch_next and dis_notch_prev, therefore, may be determined by the ratio of the previous or next line luma and chroma compare to the previous or next line luma only compare.

If the amplitude of the band passed video signal is very small relative to the difference to the closest matching line, then the disable notch parameter may not be considered as an accurate measure. In this case, the disable notch may not be used. A disable vertical notch, dis_vert_notch, parameter may be utilized instead.

Figure 3F:
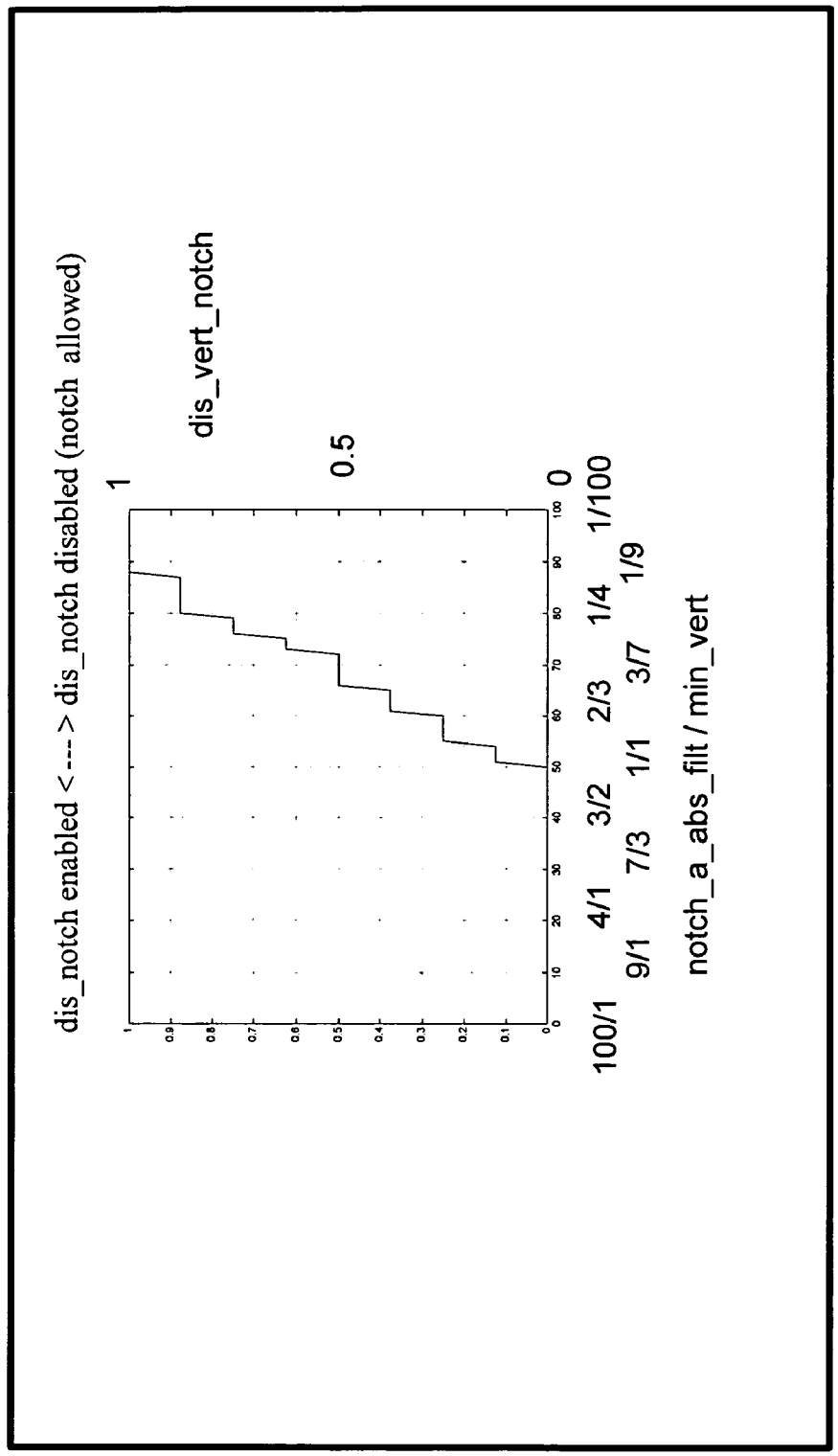
FIG. 3F is a diagram of a blending decision factor related to horizontal combing in a NTSC or a PAL video signal, in accordance with an embodiment of the invention.

FIG. 3F is a diagram of a blending decision factor related to horizontal combing in a NTSC or a PAL video signal, in accordance with an embodiment of the invention. Referring now to FIG. 3F, a dis_vert_notch may be calculated as a ratio of notch_a_abs_filt and min_vert, for example. Notch_a_abs_filt may measure the absolute value of an amplitude of a signal on a current line. Min_vert may be associated with the minimum of bandwidth difference between current line and a previous line for a NTSC signal, or two lines previous for a PAL signal, and/or a current line and a next line for a NTSC signal, and two lines next for a PAL signal.

Conceptually, if dis_vert_notch is zero, then it has no effect. Dis_notch is allowed to mask or not mask notch. If dis_vert_notch is one, then dis_notch has no effect and dis_notch may be disabled. In this case, notch may not be masked, and the decision to notch or vertically comb may be utilized without modification. A weighted disable notch ratio dis_notch may be calculated as:

dis_notch=max(dis_notch, dis_vert_notch)

The calculated notch signal may be cubed and disable notch may be squared. This may cause the roll off due to notch to be accelerated. Then disable notch may be used to calculate a final value for notching. Notch may also be low pass filtered and may be generated according to the following equation:

notch=dis_notch^2*notch^3

Referring again to FIG. 3A, since points A and GA are 180 degrees out of phase with each other, in chroma, they may not be directly compared, except in the case where there is no chroma at this point. Points A, B, C and G are actual sampled points sampled at 27 MHz. All the other points may be interpolated to give 4FSC sample points. Points AL and AR may be one quarter of a subcarrier cycle away from point A. Points GAL and GAR may be one quarter of a subcarrier cycle away from point GA. Since points A and GA may be 180 degrees out of phase with each other, AL may be in phase with GAR and AR may be in phase with GAL. Since they are in phase they can be directly compared. There may be some spatial difference between these points and points A and GA. But, by shifting the samples a quarter of a cycle in each direction, the spatial difference may be minimized. In order to calculate a measure of temporal bandwidth, in the case where there is no chroma at this point, points G may be compared directly with point A. The actual measure of the temporal bandwidth may be calculated by comparing the temporal bandwidth in the case with chroma and the case of luma only. The results may be low pass filtered.

An estimate may be obtained of the quality of the 2D comb for a NTSC or a PAL video signal. This may be calculated based on the difference between the current pixel and the pixel that the 2D combing logic decided to comb with. First the vertical difference may be calculated according to the ratio of k_blend. Next this may be blended with the horizontal quality according to the ratio of notch. The qualities of the vertical blends, previous and next or two lines previous and two lines next, may be weighted together to give an overall vertical quality measure. This vertical quality measure may then be weighted together with the horizontal quality, giving an overall quality measure of the 2D comb for a NTSC or a PAL video signal.

Figure 4A:
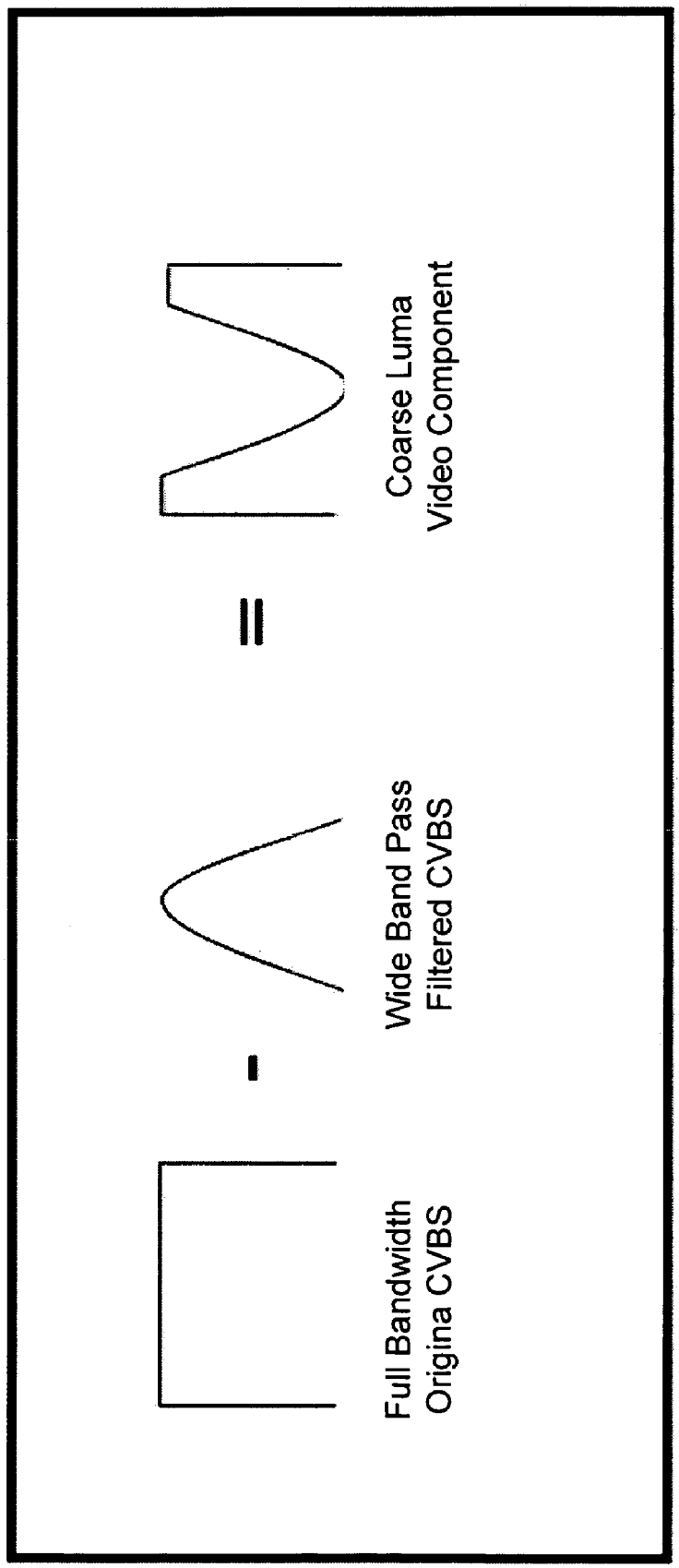
FIG. 4A is a diagram of coarse luma determination for a NTSC video signal, in accordance with an embodiment of the present invention.

FIG. 4A is a diagram of coarse luma determination for a NTSC video signal, in accordance with an embodiment of the present invention. A coarse estimate of luma may be obtained for both the current frame and the previous frame as illustrated in FIG. 4A. This may be accomplished by subtracting the band passed signal from the composite signal. In this way, the part of luma that is outside the chroma bandwidth range may be obtained. The coarse estimate of luma may be utilized to mask off the 3D combing decision for a NTSC video signal. If the luma part of the composite signal does not match between the two frames, it may be determined that there is motion. This may be true even if the band passed part of the signal matches perfectly.

Figure 4B:
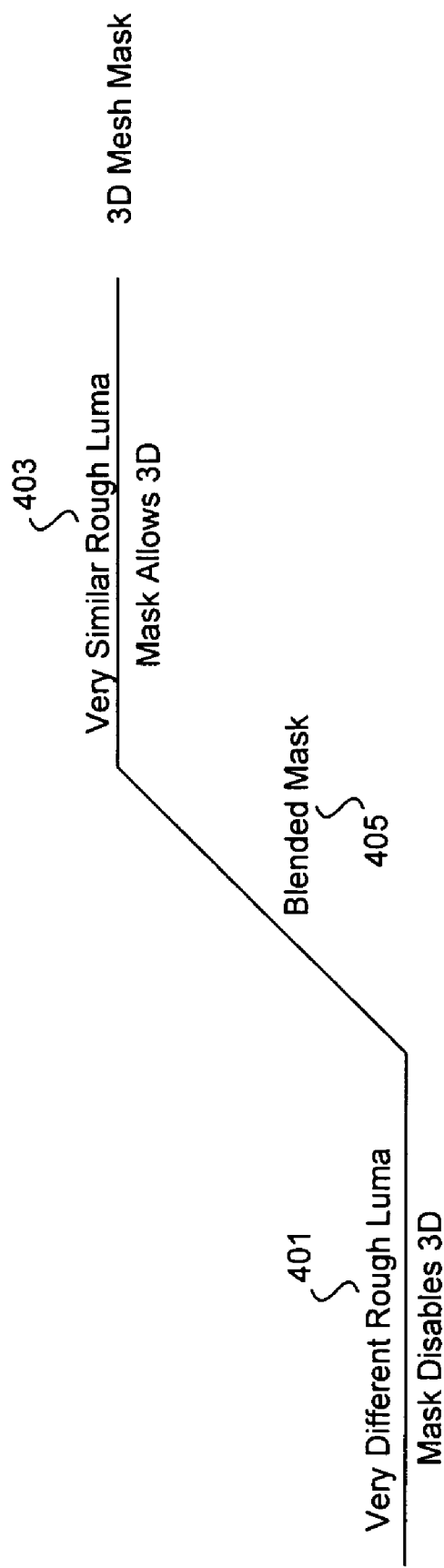
FIG. 4B is a diagram of a 3D comb filter mesh mask for a NTSC video signal, in accordance with an embodiment of the invention.

FIG. 4B is a diagram of a 3D comb filter mesh mask for a NTSC video signal, in accordance with an embodiment of the invention. A mesh mask may be utilized in order to ascertain whether 3D combing may be utilized for a NTSC composite signal. Referring now to FIG. 4B, a coarse estimate of low frequency luma may be obtained for a NTSC video signal. Such estimate of low frequency luma may be calculated for a current frame and for a previous frame, for example. The two resulting rough values of luma may then be compared on a pixel-by-pixel basis. If the two rough luma values are very different, then 3D combing of the NTSC video signal may be disabled by the mask, at 401, and 2D combing may be the only method that may be applied to separate luma and chroma components in the NTSC composite video signal. If the two rough luma values are very similar, then 3D combing may be allowed by the mask, at 403, and the composite video signal may be combed horizontally, vertically and temporally. For any value of the luma difference, which is between 401 and 403, a blended mask 405 may be applied to separate the luma and chroma components of the composite video signal.

In another embodiment of the present invention, the blended mask 405 may be applied in cases where the two rough luma values are not very different. A blended mask may indicate, for example, that a certain percentage of the 3D combing, for example 30%, may be "trusted" and the remaining percent, for example the remaining 70%, may be combed via 2D combing. The blended mask may re-adjust the ratio between 3D combing and 2D combing for a given pixel depending on how close the two rough luma values are to being very different and how close they are to being very similar.

Figure 4C:
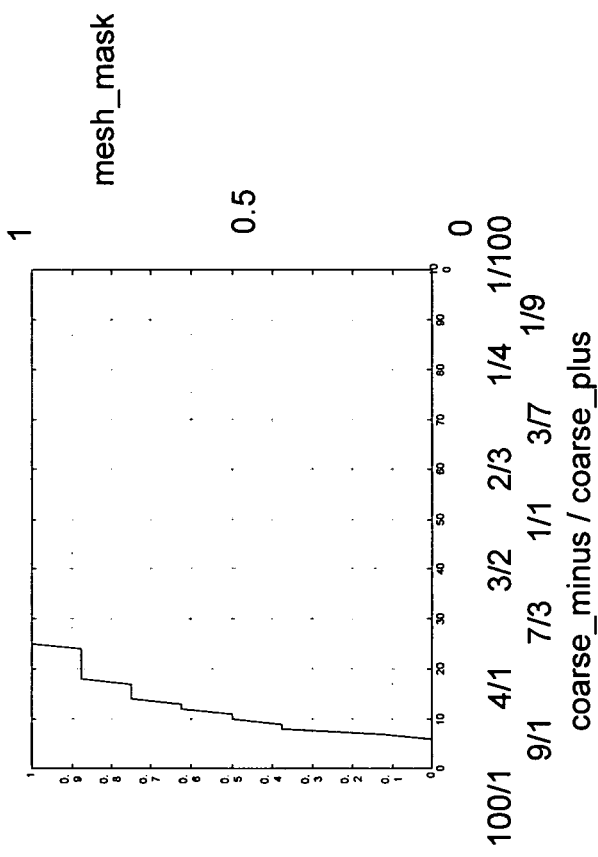
FIG. 4C is another diagram of a 3D comb filter mesh mask for a NTSC video signal, in accordance with an embodiment of the invention.

FIG. 4C is another diagram of a 3D comb filter mesh mask for a NTSC video signal, in accordance with an embodiment of the invention. Mesh_mask may be determined as a ratio between coarse_minus and coarse_plus, for example. Coarse_minus may be the difference between lumas of previous and current frames. Coarse_plus may be the sum of lumas of previous and current frames. Mesh_mask ratio may tend towards masking 3D combing if the luma between the two consecutive frames is very different. It may also tend towards allowing 3D combing of a NTSC video signal if the luma between the two consecutive frames is very similar.

Figure 4D:
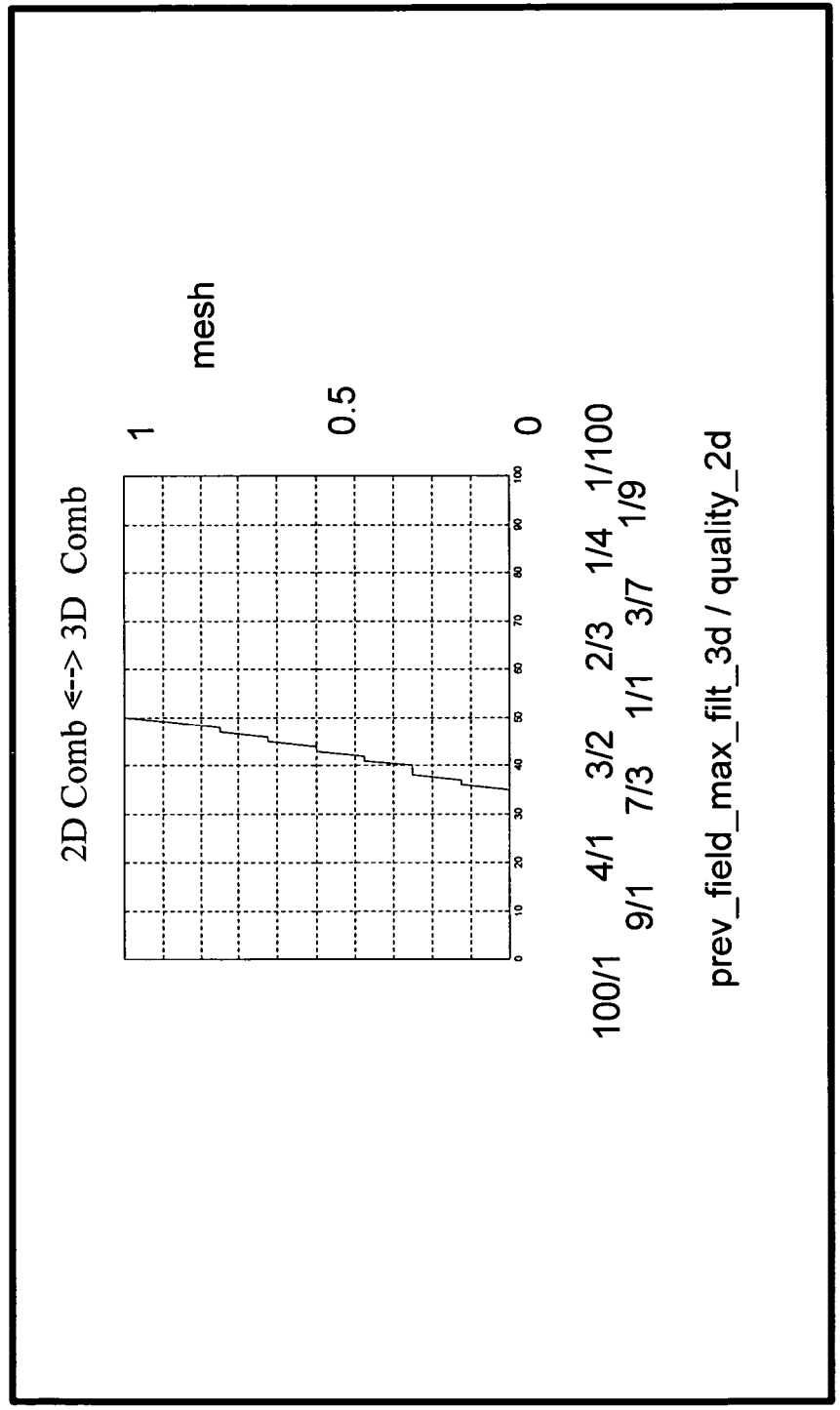
FIG. 4D is a diagram of a 3D comb filter mesh for a NTSC video signal, in accordance with an embodiment of the invention.

FIG. 4D is a diagram of a 3D comb filter mesh for a NTSC video signal, in accordance with an embodiment of the invention. Referring to FIG. 4D, a mesh ratio may be determined as a measure of combing quality of 2D combing versus 3D combing. Mesh may be determined as a ratio between prev_field_max_filt_3d and quality_2d. Prev_field_max_filt_3d may be a measure of bandwidth difference between a pixel in a current frame and the same pixel in a previous frame. Quality_2d may be a measure of quality of 2D combing, as measured, for example, by various ratios as specified above in this application.

To determine the blending of 3D combing versus 2D combing the quality of the 2D comb decision is compared with the quality of 3D combing. The ratio of these two numbers determines the blend between 2D and 3D combing. Mesh may tend towards the smaller of quality_2d (error term of 2D comb) and prev_field_max_filt_3d (error term of 3D comb). The larger prev_field_max_filt_3d is, or the worse the quality of the 3D comb, the more mesh may tend to 2D comb. The larger quality_2d, or the worse the quality of the 2D comb, the more mesh may tend to 3D comb.

A final blend of 3D combing and 2D combing may be based on the product of the mesh and the mesh mask. The following equation may be utilized:

mesh=mesh.*mesh_mask;

The final mesh value may be used to alpha blend the chroma and luma between 2D and 3D combing.

In another aspect of the invention, it may be determined whether a combed luma component in a NTSC or a PAL video signal may be mischaracterized as a chroma component. In this case, where luma may be falsely determined to be chroma, a combed video signal may lack sharpness and may look soft. A correlation blend factor (CBF) may then be utilized as a confidence factor so that the CBF may indicate whether luma may have been mischaracterized as chroma, and if so, to what extent. If CBF indicates low confidence, the chroma signal may be limited by a narrow band pass filter, for example.

Figure 5:
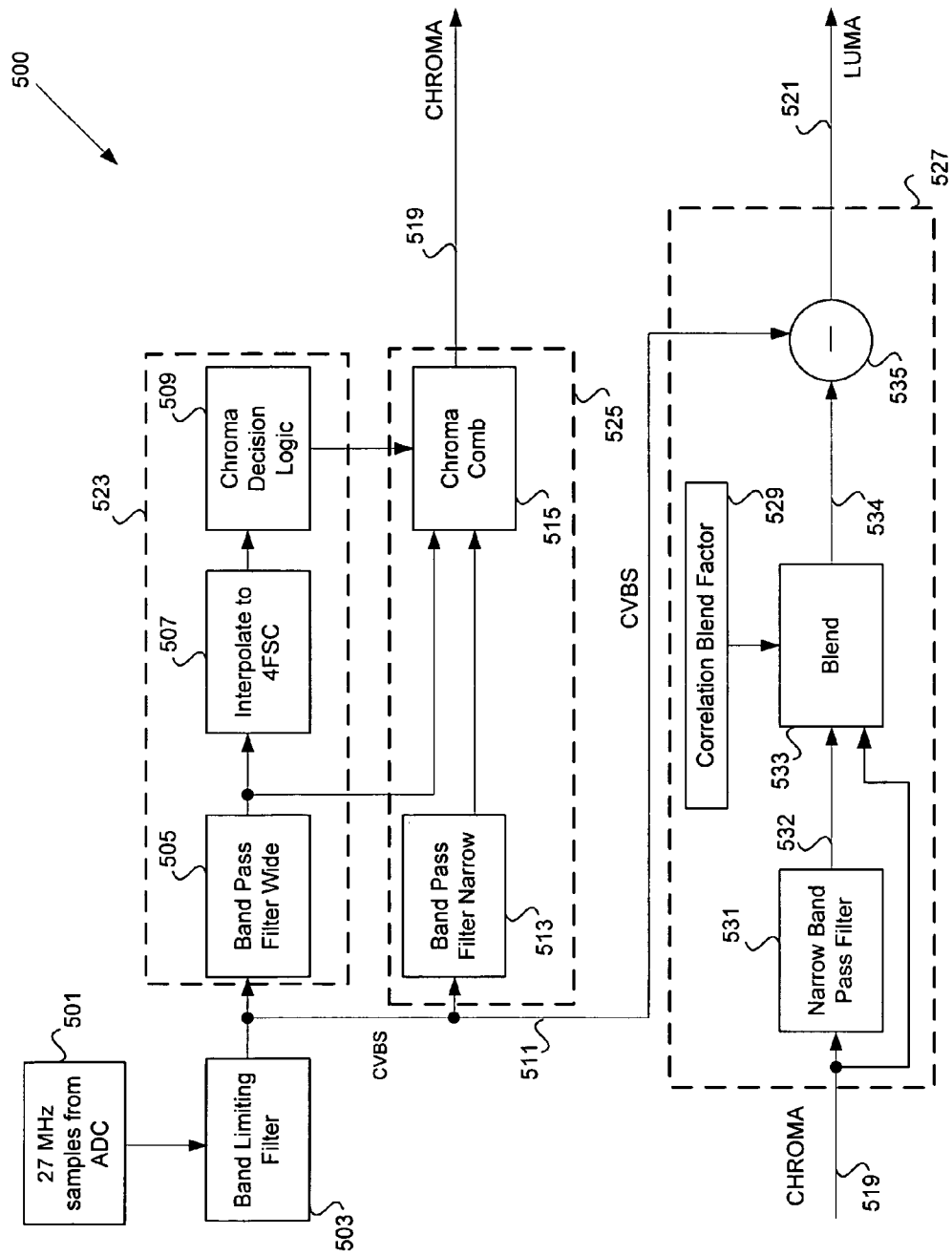
FIG. 5 is a block diagram of an exemplary adaptive comb filter for a NTSC or a PAL video signal utilizing a correlation sharpening filter, in accordance with an embodiment of the invention.

FIG. 5 is a block diagram of an exemplary adaptive comb filter for a NTSC or a PAL video signal utilizing a correlation sharpening filter, in accordance with an embodiment of the invention. Referring now to FIG. 5, the comb filter 500 may comprise an analog-to-digital converter (ADC) 501, a band limiting filter 503, a decision stage 523, a blending stage 525, and a correlation sharpening filter 527. The decision stage 523 may comprise a wide band-pass filter 505, pixel interpolation logic 507, and a chroma decision logic 509. The blending stage 525 may comprise a narrow band-pass filter 513 and a chroma comb 515. The correlation sharpening filter 527 may comprise a narrow band pass filter 531, blending logic 533 and a separator 535.

The ADC 501 receives an analog NTSC or PAL composite video signal and converts this signal to a digital signal containing 27 MHz pixel samples. The digital signal containing the 27 MHz pixel samples is then band limited by the band limiting filter 503. The band limited composite video broadcast signal (CVBS) 511 from the band limited filter 503 is then transferred to the decision stage 523, the blending stage 525 and the correlation sharpening filter 527. Within the decision stage 523, the wide band-pass filter 505 may be utilized to pre-filter the very low and very high frequency luma components within the composite video signal. In this way, if there is very coarse (VC), slow moving luma changes, such VC luma may be eliminated and not be considered in subsequent vertical and/or temporal combing processes. If a subcarrier frequency of 4.43 MHz for a PAL signal, or 3.58 MHz for a NTSC signal, is utilized, chroma components may be centered around 4.43 MHz for a PAL signal and 3.58 MHz for a NTSC signal, or approximately between 2 and 5 MHz. In other words, any frequency content below 2 MHz may be considered a luma component and may be filtered out by the band pass filter.

The pixel interpolation logic 507 may comprise suitable circuitry, logic and/or code and may be adapted to interpolate pixels in adjacent pixel lines for a NTSC comb, and non-adjacent pixel lines for PAL corm, as outlined on FIGS. 3A and 3B respectively. The interpolated pixels may then be utilized by the chroma decision logic 509. The chroma decision logic 509 may comprise suitable circuitry, logic and/or code and may be utilized to perform comparisons between pixels in a current pixel line and/or pixels in adjacent and non-adjacent pixel lines, as outlined on FIGS. 3A and 3B respectively. The chroma decision logic 509 may also be adapted to generate various blending ratios that may be utilized by the blending stage 525 and/or by the correlation sharpening filter 527 to accomplish blending of horizontal and/or vertical combing and/or improvement in the separated signal. For example, the chroma decision logic 509 may be adapted to generate the k_blend and notch ratios utilized in blending combing as described above. In addition, the chroma decision logic 509 may be adapted to generate a correlation blend factor (CBF) 529, utilized by the correlation sharpening filter 527.

Within the blending stage 525, the CVBS 511 may first be filtered by the narrow band pass filter 513. In this way, a narrow chroma signal may be generated. The narrow chroma signal, together with the wide band pass filtered signal from the output of filter 505, may be transferred to the chroma comb 515. The chroma comb 515 may comprise suitable logic, circuitry and/or code and may be adapted to blend combing between the received composite signal from the filter 505 and the narrow chroma signal from the filter 513. The chroma comb 515 may also be adapted to perform 2D and/or 3D combing in connection with a PAL and/or a NTSC composite video signal. The chroma comb 515 may also utilize blending ratios, such as k_blend and notch ratios, received from the chroma decision logic 509. The chroma comb 515 may generate the separated chroma component 519 at its output.

In another aspect of the invention, the chroma component 519 may be further separated into a U and a V component utilizing blending ratios generated by the decision stage 523.

The separated chroma component 519 may also be utilized by the correlation sharpening filter 527 to improve the video signal sharpness and to obtain the luma component 521. In order to obtain the CBF 529 for a given PAL and/or a NTSC composite video signal, it may be determined by the decision stage 523, for example, how closely a current pixel may be correlated to any pixels around it. If the correlation is very low to all the pixels around it, the CBF 529 may be determined as a low value. A low value for the CBF 529 may indicate a poor quality combing and bandwidth in every direction. If CBF 529 is low, some of the data may be recharacterized as luma. The chroma 519 obtained from the chroma comb 515 may then be band pass filtered by the narrow band pass filter 531 in the correlation sharpening filter 527. The narrow band pass filtered chroma 532 may then be blended with the original chroma input 519 by the blending logic 533. The blending logic may utilize the CBF 529 to accomplish the blending. The resulting blended chroma signal 534 may be characterized with high confidence of pure chroma signal and low mischaracterized luma. The blended chroma signal 534 may then be subtracted from the CVBS 511 by the separator 535. The resulting signal 521 may be characterized as luma. Since the blended chroma signal 534 was band pass filtered and blended by the blending logic 533 using the CBF 529, the resulting luma may be characterized by increased bandwidth. The increased bandwidth luma signal may contribute to increasing the sharpness of the combed video signal.

In another aspect of the invention, the CBF generation may be programmable. In this regard, a processor may be utilized for programming the generation of the CBF. A correlation sharpening filter 620 may be utilized during combing of a NTSC video signal characterized, for example, by a large bandwidth in different directions. Such large bandwidth may cause too much information to be placed into chroma, which may subsequently soften the luma.

Figure 6:
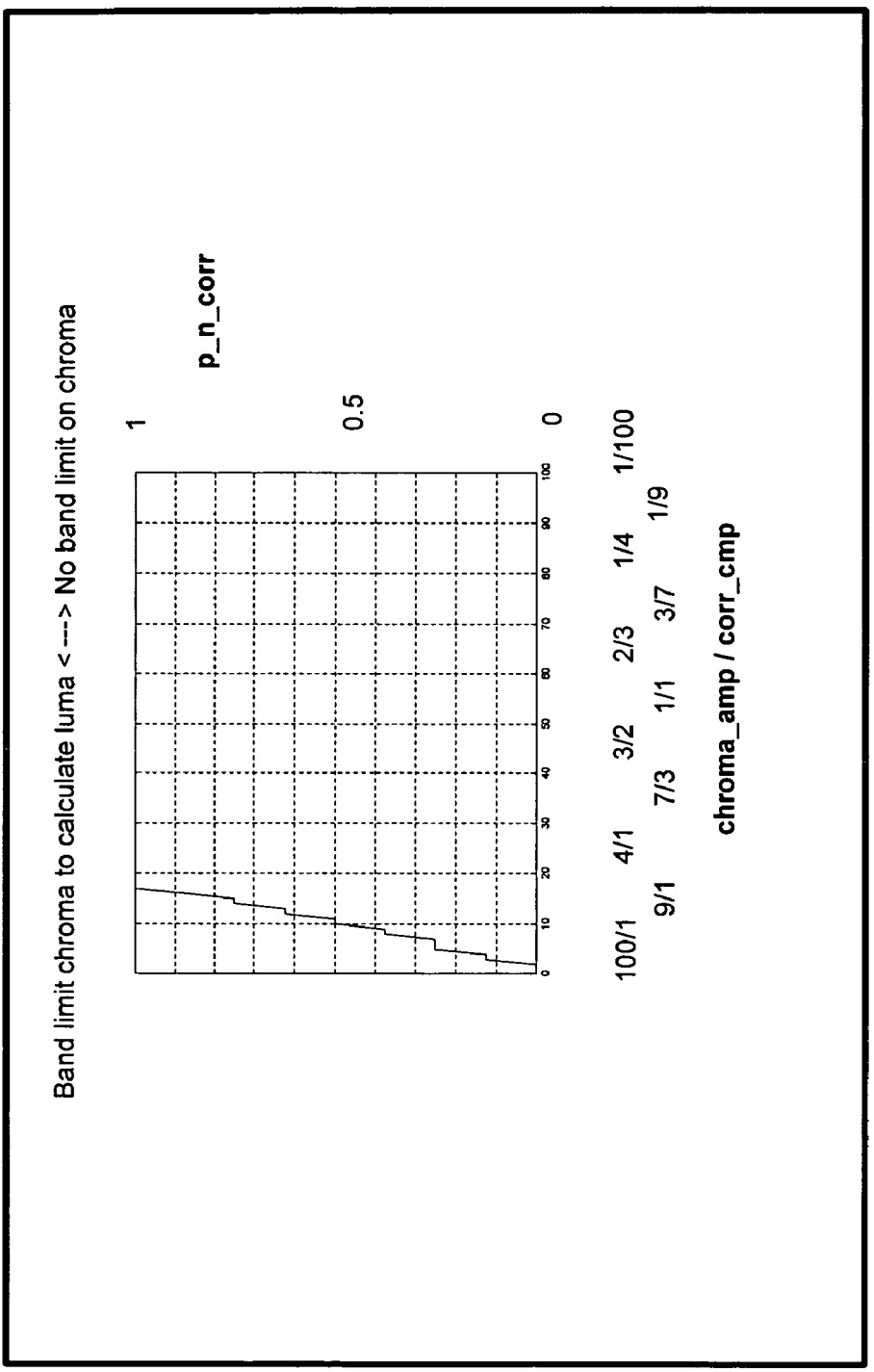
FIG. 6 is a diagram of a blending decision factor related to the utilization of a correlation sharpening filter, in accordance with an embodiment of the invention.

FIG. 6 is a diagram of a blending decision factor related to the utilization of a correlation sharpening filter, in accordance with an embodiment of the invention. Referring to FIG. 6, a p_n_corr ratio may be generated in order to determine whether to band limit a chroma component or not. The p_n_corr ratio may be indicative of how well a current pixel correlates to any surrounding pixels. The correlation p_n_corr may be estimated utilizing a ratio of the closest matched neighboring pixel corr_cmp to the amplitude of the chroma chroma_amp. A check may be performed to determine whether the bandwidth of the part of the signal determined to be chroma may be reasonable. If not, a luma component may be calculated using a narrow bandwidth limited chroma.

If there is very little correlation, then it may be assumed that there may be no perfect direction in which to comb horizontally or vertically. In this case, the safest assumption may be to limit the chroma bandwidth by utilizing the band pass filtered version of chroma to calculate luma. Conceptually, when the correlation between surrounding pixels is very small, it may be assumed that there may be too much cross-chrominance. The chroma may then be band limited before generating luma to allow the cross-chrominance to be returned to luma. This may cause the picture to be sharper. A correlation blend decision may then be applied to band limit the chroma before calculating luma in places where there is little correlation with surrounding pixels.

Figure 7:
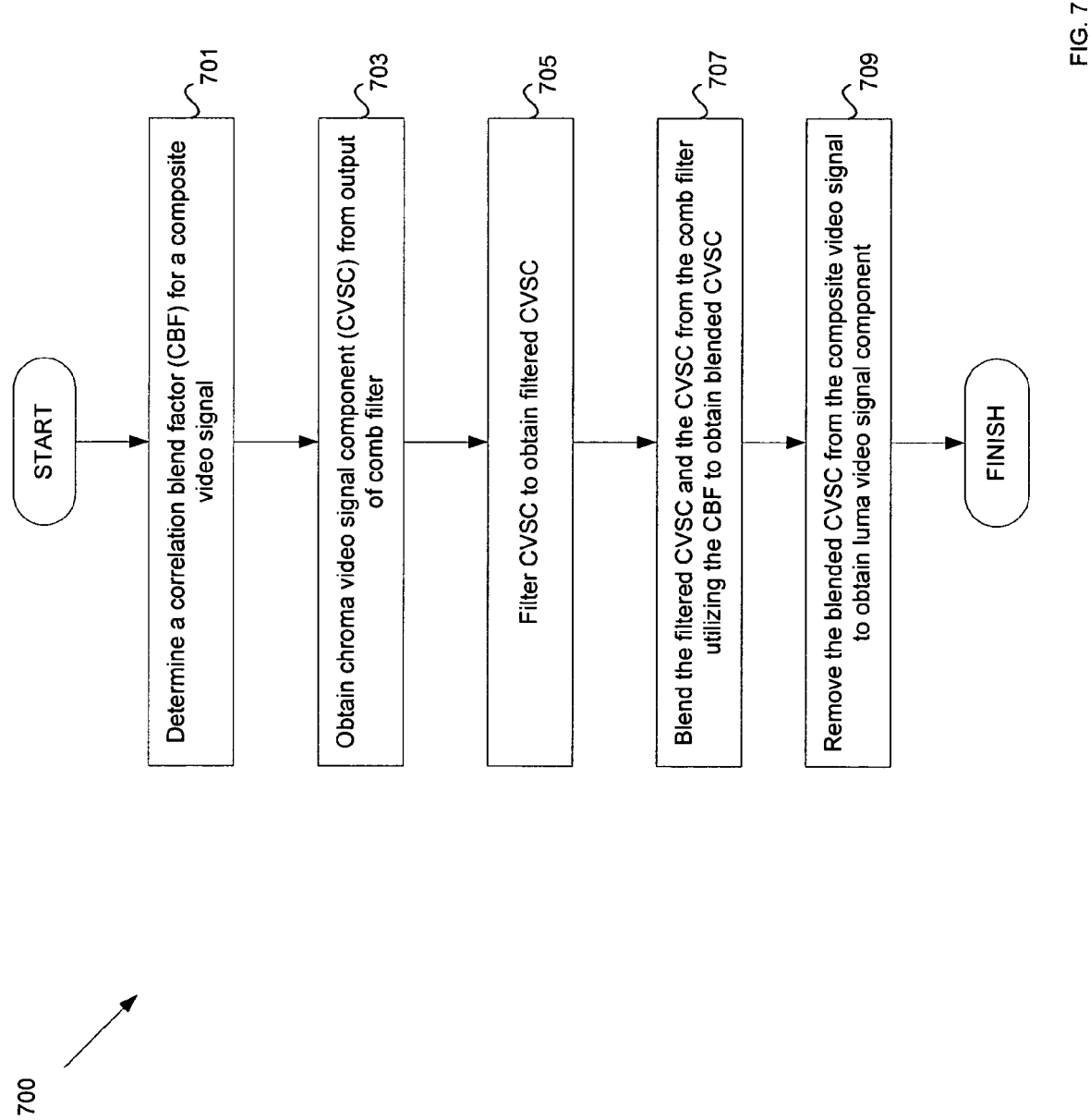
FIG. 7 is a flow diagram of an exemplary method for correlation sharpening filtering, in accordance with an embodiment of the invention.

FIG. 7 is a flow diagram of an exemplary method 700 for correlation sharpening filtering, in accordance with an embodiment of the invention. At 701, a correlation blend factor (CBF) may be determined for a PAL or a NTSC composite video signal. For example, the CBF may be determined by a chroma decision logic that may be utilized in connection with an adaptive comb for combing the PAL or NTSC video signal. At 703, the NTSC or PAL signal may be combed and chroma video signal component (CVSC) may be obtained. For example, the CVSC may be obtained from the output of a chroma comb filter that may be utilized for combing of the PAL or NTSC video signal. At 705, the CVSC may be filtered. In one aspect of the invention, a narrow band pass filter may be utilized to filter the CVSC to obtain filtered CVSC. At 707, the filtered CVSC and the CVSC from the output of the comb filter may be blended utilizing the CBF. At 709, the blended CVSC may be removed from the PAL or NTSC composite video signal to obtain the luma signal component.

Figure 8:
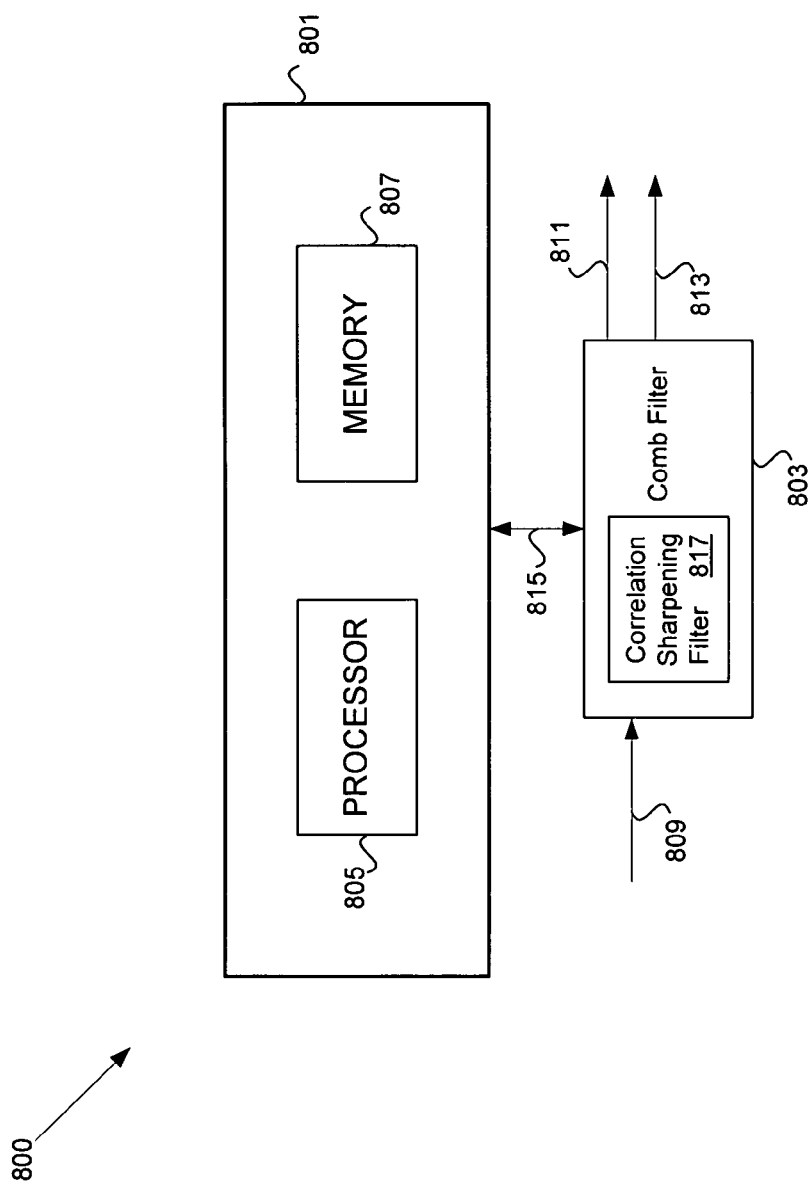
FIG. 8 is a block diagram of an exemplary system that may be used in connection with a comb filter utilizing a correlation sharpening filter, in accordance with an embodiment of the invention.

FIG. 8 is a block diagram of an exemplary system that may be used in connection with a comb filter utilizing a correlation sharpening filter, in accordance with an embodiment of the invention. Referring to FIG. 8, the system 800 may comprise a host 801 and a comb filter 803. The host 801 may comprise a processor 805 and a host memory 807. The host 801 may be communicatively coupled to the comb filter 803 via an interface bus 815. In another embodiment of the present invention, the comb filter 803 may be a part of the host 801. The comb filter 803 may comprise a correlation sharpening filter (CSF) 817.

In operation, the comb filter 803 may comprise suitable logic, circuitry and/or code and may be adapted to receive a composite video signal 809, separate the chroma and luma components, and then output the chroma component 811 and the luma component 813 separately. The video signal 809 may be a PAL video signal or a NTSC video signal, for example. The processor 805 may determine a correlation between a current pixel and one or more adjacent pixels. The CSF 817 may be adapted to blend chroma video signal components of the composite video signal 809 based on the determined correlation. The CSF 817 may then determine a luma video signal component based on the blended chroma video signal components.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for separating luma and chroma components in a composite video signal, the method comprising:

determining a correlation between a current pixel and at least one adjacent pixel;

blending a plurality of chroma video signal components of a composite video signal based on the determined correlation; and determining a luma video signal component based on the blended chroma video signal components.

2. The method according to claim 1, comprising filtering at least a portion of the plurality of chroma video signal components resulting in filtered chroma video signal.

3. The method according to claim 2, comprising blending at least a portion of the plurality of chroma video signal components and the filtered chroma video signal based on the determined correlation.

4. The method according to claim 3, comprising removing the blended at least a portion of the plurality of chroma video signal components from the composite video signal to obtain the luma video signal component.

5. The method according to claim 2, comprising narrow band pass filtering the plurality of chroma video signal components.

6. The method according to claim 1, wherein the composite video signal is a PAL composite video signal.

7. The method according to claim 1, wherein the composite video signal is a NTSC composite video signal.

8. A machine-readable storage having stored thereon, a computer program having at least one code section for separating luma and chroma components in a composite video signal, the at least one code section being executable by a machine to perform steps comprising:
   determining a correlation between a current pixel and at least one adjacent pixel;
   blending a plurality of chroma video signal components of a composite video signal based on the determined correlation; and
   determining a luma video signal component based on the blended chroma video signal components.

9. The machine-readable storage according to claim 8, comprising code for filtering at least a portion of the plurality of chroma video signal components resulting in filtered chroma video signal.

10. The machine-readable storage according to claim 9, comprising code for blending at least a portion of the plurality of chroma video signal components and the filtered chroma video signal based on the determined correlation.

11. The machine-readable storage according to claim 10, comprising code for removing the blended at least a portion of the plurality of chroma video signal components from the composite video signal to obtain the luma video signal component.

12. The machine-readable storage according to claim 9, comprising code for narrow band pass filtering the plurality of chroma video signal components.

13. The machine-readable storage according to claim 8, wherein the composite video signal is a PAL composite video signal.

14. The machine-readable storage according to claim 8, wherein the composite video signal is a NTSC composite video signal.

15. A system for separating luma and chroma components in a composite video signal, the system comprising:
   first circuitry that determines a correlation between a current pixel and at least one adjacent pixel;
   second circuitry that blends a plurality of chroma video signal components of a composite video signal based on the determined correlation; and
   third circuitry that determines a luma video signal component based on the blended chroma video signal components.

16. The system according to claim 15, comprising a filter that filters at least a portion of the plurality of chroma video signal components resulting in filtered chroma video signal.

17. The system according to claim 15, wherein the first circuitry comprises chroma decision circuitry, the second circuitry comprises blending circuitry and the third circuitry comprises separation circuitry.

18. The system according to claim 16, wherein the second circuitry blends at least a portion of the plurality of chroma video signal components and the filtered chroma video signal based on the determined correlation.

19. The system according to claim 18, wherein the third circuitry removes the blended at least a portion of the plurality of chroma video signal components from the composite video signal to obtain the luma video signal component.

20. The system according to claim 16, wherein the filter narrow band pass filters the plurality of chroma video signal components.

21. The system according to claim 15, wherein the composite video signal is a PAL composite video signal.

22. The system according to claim 15, wherein the composite video signal is a NTSC composite video signal.

23. The system according to claim 15, wherein the third circuitry comprises a processor.

* * * * *